(12) United States Patent
Dirac et al.

(10) Patent No.: US 11,386,351 B2
(45) Date of Patent: *Jul. 12, 2022

(54) MACHINE LEARNING SERVICE

(71) Applicant: Amazon Technologies, Inc., Seattle, WA (US)

(72) Inventors: Leo Parker Dirac, Seattle, WA (US); Nicolle M. Correa, Seattle, WA (US); Aleksandr Mikhaylovich Ingerman, Seattle, WA (US); Sriram Krishnan, Sammamish, WA (US); Jin Li, Bellevue, WA (US); Sudhakar Rao Puvvadi, Bellevue, WA (US); Saman Zarandioon, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 944 days.

This patent is subject to a terminal disclaimer.

(21) Appl. No.: 16/159,441

(22) Filed: Oct. 12, 2018

(65) Prior Publication Data
US 2019/0050756 A1 Feb. 14, 2019

Related U.S. Application Data

(63) Continuation of application No. 14/319,902, filed on Jun. 30, 2014, now Pat. No. 10,102,480.

(51) Int. Cl.
*G06N 20/00* (2019.01)
*G06N 99/00* (2019.01)

(52) U.S. Cl.
CPC .................. *G06N 20/00* (2019.01)

(58) Field of Classification Search
CPC ...... G06N 99/005; G06N 99/00; G06N 20/00; G06N 7/00
See application file for complete search history.

(56) References Cited

U.S. PATENT DOCUMENTS

| | | |
|---|---|---|
| 4,821,333 A | 4/1989 | Gillies |
| 6,230,131 B1 | 5/2001 | Kuhn et al. |
| 6,408,290 B1 | 6/2002 | Thiessen et al. |
| 6,681,383 B1 | 1/2004 | Pastor et al. |
| 6,804,691 B2 | 10/2004 | Coha et al. |

(Continued)

OTHER PUBLICATIONS

Office Action in Canadian Patent Application No. 2,953,969 dated Feb. 11, 2021, Amazon Technologies, Inc., pp. 1-9.

(Continued)

*Primary Examiner* — Paulinho E Smith
(74) *Attorney, Agent, or Firm* — Robert C. Kowert; Kowert, Hood, Munyon, Rankin & Goetzel, P.C.

(57) ABSTRACT

A machine learning service implements programmatic interfaces for a variety of operations on several entity types, such as data sources, statistics, feature processing recipes, models, and aliases. A first request to perform an operation on an instance of a particular entity type is received, and a first job corresponding to the requested operation is inserted in a job queue. Prior to the completion of the first job, a second request to perform another operation is received, where the second operation depends on a result of the operation represented by the first job. A second job, indicating a dependency on the first job, is stored in the job queue. The second job is initiated when the first job completes.

20 Claims, 19 Drawing Sheets

(56) References Cited

U.S. PATENT DOCUMENTS

| | | |
|---|---|---|
| 7,328,218 B2 | 2/2008 | Steinberg et al. |
| 7,743,003 B1 | 6/2010 | Tong et al. |
| 8,078,556 B2 | 12/2011 | Adi et al. |
| 8,229,864 B1 | 7/2012 | Lin et al. |
| 8,370,280 B1 | 2/2013 | Lin et al. |
| 8,429,103 B1 | 4/2013 | Aradhye et al. |
| 8,463,071 B2 | 6/2013 | Snavely et al. |
| 8,499,010 B2 | 7/2013 | Gracie et al. |
| 8,510,238 B1 | 8/2013 | Aradhye et al. |
| 8,606,730 B1 | 12/2013 | Tong et al. |
| 8,682,814 B2 | 3/2014 | DiCorpo et al. |
| 8,886,576 B1 | 11/2014 | Sanketi et al. |
| 9,020,861 B2 | 4/2015 | Lin et al. |
| 9,069,737 B1 | 6/2015 | Kimotho et al. |
| 9,380,032 B2 | 6/2016 | Resch et al. |
| 10,102,480 B2 | 10/2018 | Dirac et al. |
| 2003/0191795 A1* | 10/2003 | Bernardin ............... G06F 9/505 718/105 |
| 2004/0059966 A1* | 3/2004 | Chan ............... G06F 11/0775 714/48 |
| 2005/0097068 A1 | 5/2005 | Graepel et al. |
| 2005/0105712 A1 | 5/2005 | Williams et al. |
| 2005/0119999 A1 | 6/2005 | Zait et al. |
| 2006/0050953 A1* | 3/2006 | Farmer ............... G06K 9/4642 382/159 |
| 2006/0179016 A1 | 8/2006 | Forman et al. |
| 2006/0195508 A1* | 8/2006 | Bernardin ............... G06F 9/505 709/203 |
| 2006/0212142 A1 | 9/2006 | Madani et al. |
| 2007/0185896 A1 | 8/2007 | Jagannath et al. |
| 2008/0008116 A1* | 1/2008 | Buga ............... H04L 41/046 370/328 |
| 2008/0010642 A1* | 1/2008 | MacLellan ............ G06F 9/5038 718/102 |
| 2008/0033900 A1 | 2/2008 | Zhang et al. |
| 2008/0082316 A1 | 4/2008 | Tsui et al. |
| 2010/0100416 A1 | 4/2010 | Herbrich et al. |
| 2010/0115519 A1* | 5/2010 | Chechik ............... G01C 11/025 718/101 |
| 2010/0223211 A1 | 9/2010 | Johnson et al. |
| 2010/0262568 A1 | 10/2010 | Schwaighofer et al. |
| 2011/0145920 A1 | 6/2011 | Mahaffey et al. |
| 2011/0185230 A1 | 7/2011 | Agrawal et al. |
| 2011/0225594 A1 | 9/2011 | Iyengar et al. |
| 2011/0313953 A1 | 12/2011 | Lane et al. |
| 2011/0320767 A1 | 12/2011 | Eren et al. |
| 2012/0054658 A1 | 3/2012 | Chuat et al. |
| 2012/0089446 A1 | 4/2012 | Gupta et al. |
| 2012/0131088 A1 | 5/2012 | Liu et al. |
| 2012/0158791 A1 | 6/2012 | Kasneci et al. |
| 2012/0191631 A1 | 7/2012 | Breckenridge et al. |
| 2012/0253927 A1 | 10/2012 | Qin et al. |
| 2013/0097706 A1 | 4/2013 | Titonis et al. |
| 2013/0132963 A1* | 5/2013 | Lukyanov ............... G06F 21/52 718/103 |
| 2013/0185729 A1* | 7/2013 | Vasic ............... G06F 9/5072 718/104 |
| 2013/0191513 A1 | 7/2013 | Kamen et al. |
| 2013/0268457 A1* | 10/2013 | Wang ............... G06Q 30/0203 705/347 |
| 2013/0297330 A1* | 11/2013 | Kamen ............... G16H 20/40 705/2 |
| 2013/0318240 A1 | 11/2013 | Hebert et al. |
| 2013/0323720 A1 | 12/2013 | Watelet et al. |
| 2013/0346347 A1 | 12/2013 | Patterson et al. |
| 2013/0346594 A1* | 12/2013 | Banerjee ............... G06F 11/3495 709/224 |
| 2014/0019542 A1 | 1/2014 | Rao et al. |
| 2014/0046879 A1 | 2/2014 | MacLennan et al. |
| 2014/0095521 A1* | 4/2014 | Blount ............... G06F 16/9558 707/756 |
| 2014/0121564 A1 | 5/2014 | Raskin |
| 2014/0122381 A1 | 5/2014 | Nowozin |
| 2015/0379072 A1 | 12/2015 | Dirac et al. |
| 2015/0379423 A1 | 12/2015 | Dirac et al. |
| 2015/0379425 A1 | 12/2015 | Dirac et al. |
| 2015/0379426 A1 | 12/2015 | Steele et al. |
| 2015/0379427 A1 | 12/2015 | Dirac et al. |
| 2015/0379428 A1 | 12/2015 | Dirac et al. |
| 2015/0379429 A1 | 12/2015 | Lee et al. |
| 2015/0379430 A1 | 12/2015 | Dirac et al. |
| 2016/0026720 A1 | 1/2016 | Lehrer et al. |

OTHER PUBLICATIONS

Office Action in European Patent Application No. 15739125.1 dated Mar. 18, 2021, Amazon Technologies, Inc., pp. 1-9.

Office Action in European Patent Application No. 15739127.7 dated Mar. 18, 2021, Amazon Technologies, Inc., pp. 1-9.

Kranjc, Janez, et al.,"Real-time data analysis in ClowdFlows", 2013 IEEE International Conference On Big Data, Oct. 6, 2013, pp. 15-22; IEEE.

Kranjc, Janez, et al., "ClowdFlows: A Cloud Based Scientific Workflow Platform", Joint European Conference On Machine Learning and Knowledge Discovery in Databases, Part II, Lecture Notes in Computer Science 7524, Sep. 24, 2012, pp. 816-819; Springer, Berlin, Heidelberg.

Kranjc, Janez, et al., "Active learning for sentiment analysis on data streams: Methodology and workflow implementation in the ClowdFlows platform", Information Processing & Management, Mar. 2015, vol. 51, No. 2, pp. 187-203; Elsevier, Barking, GB.

* cited by examiner

```
grammar MLS-Recipe;
expr
    : BAREID
    | QUOTEDID
    | NUMBER
    | functioncall
    ;
functioncall
    : BAREID '('
        functionparams?
      ')'
    ;
functionparams
    : expr ( ',' expr )*
    ;

BAREID   : [A-Za-z][a-zA-Z0-9_]* ;
QUOTEDID : '\'' ('\\''|'.)*? '\'' ;
NUMBER
    : '-'? INT '.' INT EXP? // 1.35, 1.35E-9, 0.3, -4.5
    | '-'? INT EXP // 1e10 -3e4
    | '-'? INT // -3, 45
    ;
fragment INT : '0' | [1-9] [0-9]* ;   // no leading zeros
fragment EXP : [Ee] [+\-]? INT ;
WHITESPACE : [ \t\r\n]+ -> skip ;   // skip spaces, tabs, newlines
COMMENT    : '//' (~[\r\n])* -> skip ;
```

Grammar 1320 for recipe expressions

FIG. 13

MACHINE LEARNING SERVICE

This application is a continuation of U.S. patent application Ser. No. 14/319,902, filed Jun. 30, 2014, now U.S. Pat. No. 10,102,480, which is hereby incorporated by reference herein in its entirety.

BACKGROUND

Machine learning combines techniques from statistics and artificial intelligence to create algorithms that can learn from empirical data and generalize to solve problems in various domains such as natural language processing, financial fraud detection, terrorism threat level detection, human health diagnosis and the like. In recent years, more and more raw data that can potentially be utilized for machine learning models is being collected from a large variety of sources, such as sensors of various kinds, web server logs, social media services, financial transaction records, security cameras, and the like.

Traditionally, expertise in statistics and in artificial intelligence has been a prerequisite for developing and using machine learning models. For many business analysts and even for highly qualified subject matter experts, the difficulty of acquiring such expertise is sometimes too high a barrier to be able to take full advantage of the large amounts of data potentially available to make improved business predictions and decisions. Furthermore, many machine learning techniques can be computationally intensive, and in at least some cases it can be hard to predict exactly how much computing power may be required for various phases of the techniques. Given such unpredictability, it may not always be advisable or viable for business organizations to build out their own machine learning computational facilities.

The quality of the results obtained from machine learning algorithms may depend on how well the empirical data used for training the models captures key relationships among different variables represented in the data, and on how effectively and efficiently these relationships can be identified. Depending on the nature of the problem that is to be solved using machine learning, very large data sets may have to be analyzed in order to be able to make accurate predictions, especially predictions of relatively infrequent but significant events. For example, in financial fraud detection applications, where the number of fraudulent transactions is typically a very small fraction of the total number of transactions, identifying factors that can be used to label a transaction as fraudulent may potentially require analysis of millions of transaction records, each representing dozens or even hundreds of variables. Constraints on raw input data set size, cleansing or normalizing large numbers of potentially incomplete or error-containing records, and/or on the ability to extract representative subsets of the raw data also represent barriers that are not easy to overcome for many potential beneficiaries of machine learning techniques. For many machine learning problems, transformations may have to be applied on various input data variables before the data can be used effectively to train models. In some traditional machine learning environments, the mechanisms available to apply such transformations may be less than optimal—e.g., similar transformations may sometimes have to be applied one by one to many different variables of a data set, potentially requiring a lot of tedious and error-prone work.

BRIEF DESCRIPTION OF DRAWINGS

FIG. 13 illustrates an example grammar that may be used to define recipe syntax, according to at least some embodiments.

Figure 1:
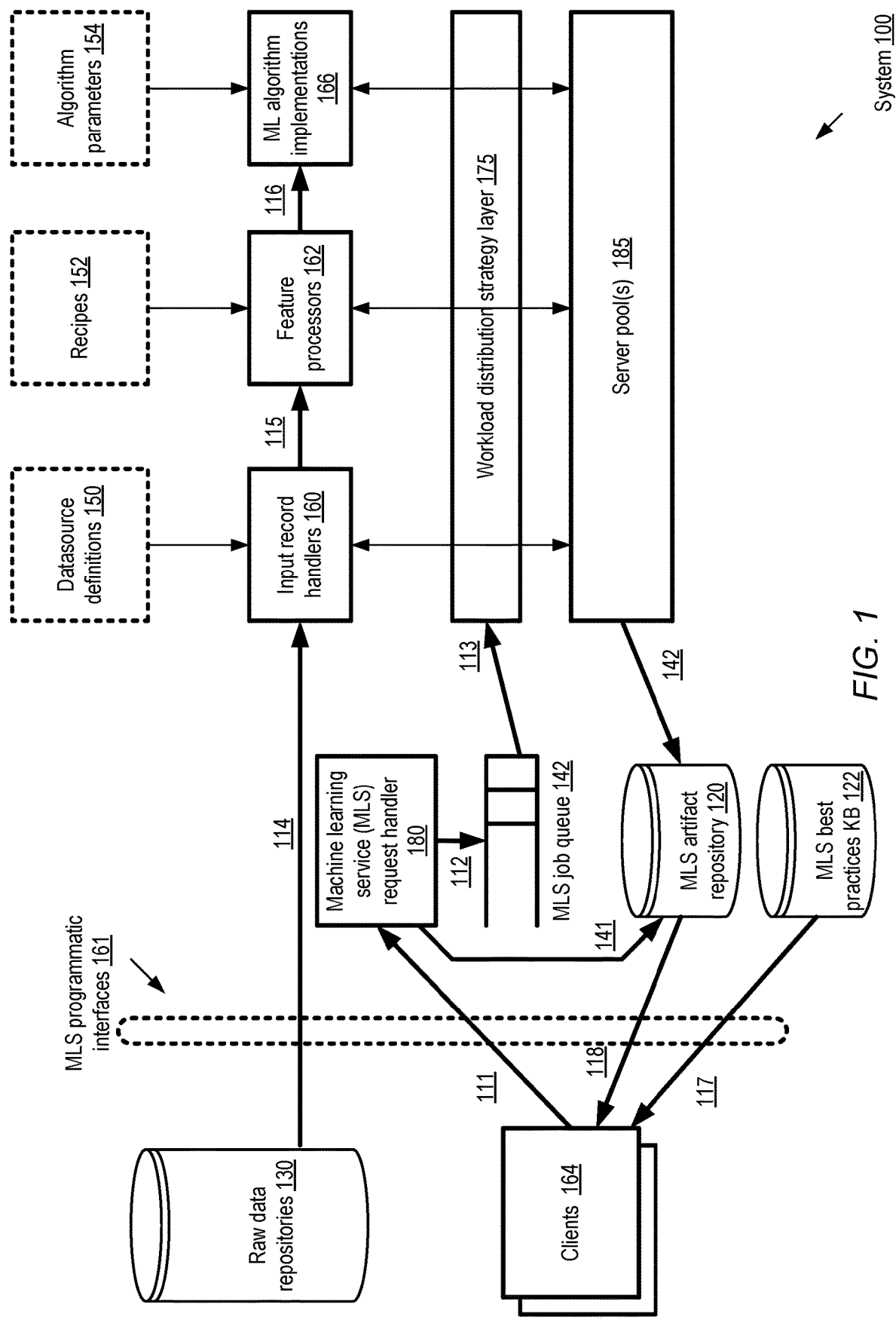
FIG. 1 illustrates an example system environment in which various components of a machine learning service may be implemented, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Various embodiments of methods and apparatus for a customizable, easy-to-use machine learning service (MLS) designed to support large numbers of users and a wide variety of algorithms and problem sizes are described. In one embodiment, a number of MLS programmatic interfaces (such as application programming interfaces (APIs)) may be defined by the service, which guide non-expert users to start using machine learning best practices relatively quickly, without the users having to expend a lot of time and effort on tuning models, or on learning advanced statistics or artificial intelligence techniques. The interfaces may, for example, allow non-experts to rely on default settings or parameters for various aspects of the procedures used for building, training and using machine learning models, where the defaults are derived from the accumulated experience of other practitioners addressing similar types of machine learning problems. At the same time, expert users may customize the parameters or settings they wish to use for various types of machine learning tasks, such as input record handling, feature processing, model building, execution and evaluation. In at least some embodiments, in addition to or instead of using pre-defined libraries implementing various types of machine learning tasks, MLS clients may be able to extend the built-in capabilities of the service, e.g., by registering their own customized functions with the service. Depending on the business needs or goals of the clients that implement such customized modules or functions, the modules may in some cases be shared with other users of the service, while in other cases the use of the customized modules may be restricted to their implementers/owners.

In some embodiments, a relatively straightforward recipe language may be supported, allowing MLS users to indicate various feature processing steps that they wish to have applied on data sets. Such recipes may be specified in text format, and then compiled into executable formats that can be re-used with different data sets on different resource sets as needed. In at least some embodiments, the MLS may be implemented at a provider network that comprises numerous data centers with hundreds of thousands of computing and storage devices distributed around the world, allowing machine learning problems with terabyte-scale or petabyte-scale data sets and correspondingly large compute requirements to be addressed in a relatively transparent fashion while still ensuring high levels of isolation and security for sensitive data. Pre-existing services of the provider network, such as storage services that support arbitrarily large data objects accessible via web service interfaces, database services, virtual computing services, parallel-computing services, high-performance computing services, load-balancing services, and the like may be used for various machine learning tasks in at least some embodiments. For MLS clients that have high availability and data durability requirements, machine learning data (e.g., raw input data, transformed/manipulated input data, intermediate results, or final results) and/or models may be replicated across different geographical locations or availability containers as described below. To meet an MLS client's data security needs, selected data sets, models or code implementing user-defined functions or third-party functions may be restricted to security containers defined by the provider network in some embodiments, in which for example the client's machine learning tasks are executed in an isolated, single-tenant fashion instead of the multi-tenant approach that may typically be used for some of the provider network's services. The term "MLS control plane" may be used herein to refer to a collection of hardware and/or software entities that are responsible for implementing various types of machine learning functionality on behalf of clients of the MLS, and for administrative tasks not necessarily visible to external MLS clients, such as ensuring that an adequate set of resources is provisioned to meet client demands, detecting and recovering from failures, generating bills, and so on. The term "MLS data plane" may refer to the pathways and resources used for the processing, transfer, and storage of the input data used for client-requested operations, as well as the processing, transfer and storage of output data produced as a result of client-requested operations.

According to some embodiments, a number of different types of entities related to machine learning tasks may be generated, modified, read, executed, and/or queried/searched via MLS programmatic interfaces. Supported entity types in one embodiment may include, among others, data sources (e.g., descriptors of locations or objects from which input records for machine learning can be obtained), sets of statistics generated by analyzing the input data, recipes (e.g., descriptors of feature processing transformations to be applied to input data for training models), processing plans (e.g., templates for executing various machine learning tasks), models (which may also be referred to as predictors), parameter sets to be used for recipes and/or models, model execution results such as predictions or evaluations, online access points for models that are to be used on streaming or real-time data, and/or aliases (e.g., pointers to model versions that have been "published" for use as described below). Instances of these entity types may be referred to as machine learning artifacts herein—for example, a specific recipe or a specific model may each be considered an artifact. Each of the entity types is discussed in further detail below.

The MLS programmatic interfaces may enable users to submit respective requests for several related tasks of a given machine learning workflow, such as tasks for extracting records from data sources, generating statistics on the records, feature processing, model training, prediction, and so on. A given invocation of a programmatic interface (such as an API) may correspond to a request for one or more operations or tasks on one or more instances of a supported type of entity. Some tasks (and the corresponding APIs) may involve multiple different entity types—e.g., an API requesting a creation of a data source may result in the generation of a data source entity instance as well as a statistics entity instance. Some of the tasks of a given workflow may be dependent on the results of other tasks. Depending on the amount of data, and/or on the nature of the processing to be performed, some tasks may take hours or even days to complete. In at least some embodiments, an asynchronous approach may be taken to scheduling the tasks, in which MLS clients can submit additional tasks that depend on the output of earlier-submitted tasks without waiting for the earlier-submitted tasks to complete. For example, a client may submit respective requests for tasks T2 and T3 before an earlier-submitted task T1 completes, even though the execution of T2 depends at least partly on the results of T1, and the execution of T3 depends at least partly on the results of T2. In such embodiments, the MLS may take care of ensuring that a given task is scheduled for execution only when its dependencies (if any dependencies exist) have been met.

A queue of job objects may be used for storing internal representations of requested tasks in some implementations. The term "task", as used herein, refers to a set of logical operations corresponding to a given request from a client, while the term "job" refers to the internal representation of a task within the MLS. In some embodiments, a given job object may represent the operations to be performed as a result of a client's invocation of a particular programmatic interface, as well as dependencies on other jobs. The MLS may be responsible for ensuring that the dependencies of a given job have been met before the corresponding operations are initiated. The MLS may also be responsible in such embodiments for generating a processing plan for each job, identifying the appropriate set of resources (e.g., CPUs/cores, storage or memory) for the plan, scheduling the execution of the plan, gathering results, providing/saving the results in an appropriate destination, and at least in some cases for providing status updates or responses to the requesting clients. The MLS may also be responsible in some embodiments for ensuring that the execution of one client's jobs do not affect or interfere with the execution of other clients' jobs. In some embodiments, partial dependencies among tasks may be supported—e.g., in a sequence of tasks (T1, T2, T3), T2 may depend on partial completion of T1, and T2 may therefore be scheduled before T1 completes. For example, T1 may comprise two phases or passes P1 and P2 of statistics calculations, and T2 may be able to proceed as soon as phase P1 is completed, without waiting for phase P2 to complete. Partial results of T1 (e.g., at least some statistics computed during phase P1) may be provided to the requesting client as soon as they become available in some cases, instead of waiting for the entire task to be completed. A single shared queue that includes jobs corresponding to requests from a plurality of clients of the MLS may be used in some implementations, while in other implementations respective queues may be used for different clients. In some embodiments, a single API request from a client may lead to the generation of several different job objects by the MLS. In at least one embodiment, not all client API requests may be implemented using jobs—e.g., a relatively short or lightweight task may be performed synchronously with respect to the corresponding request, without incurring the overhead of job creation and asynchronous job scheduling.

The APIs implemented by the MLS may in some embodiments allow clients to submit requests to create, query the attributes of, read, update/modify, search, or delete an instance of at least some of the various entity types supported. For example, for the entity type "DataSource", respective APIs similar to "createDataSource", "describeDataSource" (to obtain the values of attributes of the data source), "updateDataSource", "searchForDataSource", and "deleteDataSource" may be supported by the MLS. A similar set of APIs may be supported for recipes, models, and so on. Some entity types may also have APIs for executing or running the entities, such as "executeModel" or "executeRecipe" in various embodiments. The APIs may be designed to be largely easy to learn and self-documenting (e.g., such that the correct way to use a given API is obvious to non-experts), with an emphasis on making it simple to perform the most common tasks without making it too hard to perform more complex tasks. In at least some embodiments multiple versions of the APIs may be supported: e.g., one version for a wire protocol (at the application level of a networking stack), another version as a Java™ library or SDK (software development kit), another version as a Python library, and so on. API requests may be submitted by clients using HTTP (Hypertext Transfer Protocol), HTTPS (secure HTTP), Javascript, XML, or the like in various implementations.

In some embodiments, some machine learning models may be created and trained, e.g., by a group of model developers or data scientists using the MLS APIs, and then published for use by another community of users. In order to facilitate publishing of models for use by a wider audience than just the creators of the model, while preventing potentially unsuitable modifications to the models by unskilled members of the wider audience, the "alias" entity type may be supported in such embodiments. In one embodiment, an alias may comprise an immutable name (e.g., "SentimentAnalysisModel1") and a pointer to a model that has already been created and stored in an MLS artifact repository (e.g., "samModel-23adf-2013-12-13-08-06-01", an internal identifier generated for the model by the MLS). Different sets of permissions on aliases may be granted to model developers than are granted to the users to whom the aliases are being made available for execution. For example, in one implementation, members of a business analyst group may be allowed to run the model using its alias name, but may not be allowed to change the pointer, while model developers may be allowed to modify the pointer and/or modify the underlying model. For the business analysts, the machine learning model exposed via the alias may represent a "black box" tool, already validated by experts, which is expected to provide useful predictions for various input data sets. The business analysts may not be particularly concerned about the internal working of such a model. The model developers may continue to experiment with various algorithms, parameters and/or input data sets to obtain improved versions of the underlying model, and may be able to change the pointer to point to an enhanced version to improve the quality of predictions obtained by the business analysts. In at least some embodiments, to isolate alias users from changes to the underlying models, the MLS may guarantee that (a) an alias can only point to a model that has been successfully trained and (b) when an alias pointer is changed, both the original model and the new model (i.e., the respective models being pointed to by the old pointer and the new pointer) consume the same type of input and provide the same type of prediction (e.g., binary classification, multi-class classification or regression). In some implementations, a given model may itself be designated as un-modifiable if an alias is created for it—e.g., the model referred to by the pointer "samModel-23adf-2013-12-13-08-06-01" may no longer be modified even by its developers after the alias is created in such an implementation. Such clean separation of roles and capabilities with respect to model development and use may allow larger audiences within a business organization to benefit from machine learning models than simply those skilled enough to develop the models.

A number of choices may be available with respect to the manner in which the operations corresponding to a given job are mapped to MLS servers. For example, it may be possible to partition the work required for a given job among many different servers to achieve better performance. As part of developing the processing plan for a job, the MLS may select a workload distribution strategy for the job in some embodiments. The parameters determined for workload distribution in various embodiments may differ based on the nature of the job. Such factors may include, for example, (a) determining a number of passes of processing, (b) determining a parallelization level (e.g., the number of "mappers" and "reducers" in the case of a job that is to be implemented using the Map-Reduce technique), (c) determining a convergence criterion to be used to terminate the job, (d) determining a target durability level for intermediate data produced during the job, or (e) determining a resource capacity limit for the job (e.g., a maximum number of servers that can be assigned to the job based on the number of servers available in MLS server pools, or on the client's budget limit). After the workload strategy is selected, the actual set of resources to be used may be identified in accordance with the strategy, and the job's operations may be scheduled on the identified resources. In some embodiments, a pool of compute servers and/or storage servers may be pre-configured for the MLS, and the resources for a given job may be selected from such a pool. In other embodiments, the resources may be selected from a pool assigned to the client on whose behalf the job is to be executed—e.g., the client may acquire resources from a computing service of the provider network prior to submitting API requests, and may provide an indication of the acquired resources to the MLS for job scheduling. If client-provided code (e.g., code that has not necessarily been thoroughly tested by the MLS, and/or is not included in the MLS's libraries) is being used for a given job, in some embodiments the client may be required to acquire the resources to be used for the job, so that any side effects of running the client-provided code may be restricted to the client's own resources instead of potentially affecting other clients.

Example System Environments

FIG. 1 illustrates an example system environment in which various components of a machine learning service (MLS) may be implemented, according to at least some embodiments. In system 100, the MLS may implement a set of programmatic interfaces 161 (e.g., APIs, command-line tools, web pages, or standalone GUIs) that can be used by clients 164 (e.g., hardware or software entities owned by or assigned to customers of the MLS) to submit requests 111 for a variety of machine learning tasks or operations. The administrative or control plane portion of the MLS may include MLS request handler 180, which accepts the client requests 111 and inserts corresponding job objects into MLS job queue 142, as indicated by arrow 112. In general, the control plane of the MLS may comprise a plurality of components (including the request handler, workload distribution strategy selectors, one or more job schedulers, metrics collectors, and modules that act as interfaces with other services) which may also be referred to collectively as the MLS manager. The data plane of the MLS may include, for example, at least a subset of the servers of pool(s) 185, storage devices that are used to store input data sets, intermediate results or final results (some of which may be part of the MLS artifact repository), and the network pathways used for transferring client input data and results.

As mentioned earlier, each job object may indicate one or more operations that are to be performed as a result of the invocation of a programmatic interface 161, and the scheduling of a given job may in some cases depend upon the successful completion of at least a subset of the operations of an earlier-generated job. In at least some implementations, job queue 142 may be managed as a first-in-first-out (FIFO) queue, with the further constraint that the dependency requirements of a given job must have been met in order for that job to be removed from the queue. In some embodiments, jobs created on behalf of several different clients may be placed in a single queue, while in other embodiments multiple queues may be maintained (e.g., one queue in each data center of the provider network being used, or one queue per MLS customer). Asynchronously with respect to the submission of the requests 111, the next job whose dependency requirements have been met may be removed from job queue 142 in the depicted embodiment, as indicated by arrow 113, and a processing plan comprising a workload distribution strategy may be identified for it. The workload distribution strategy layer 175, which may also be a component of the MLS control plane as mentioned earlier, may determine the manner in which the lower level operations of the job are to be distributed among one or more compute servers (e.g., servers selected from pool 185), and/or the manner in which the data analyzed or manipulated for the job is to be distributed among one or more storage devices or servers. After the processing plan has been generated and the appropriate set of resources to be utilized for the job has been identified, the job's operations may be scheduled on the resources. Results of some jobs may be stored as MLS artifacts within repository 120 in some embodiments, as indicated by arrow 142.

In at least one embodiment, some relatively simple types of client requests 111 may result in the immediate generation, retrieval, storage, or modification of corresponding artifacts within MLS artifact repository 120 by the MLS request handler 180 (as indicated by arrow 141). Thus, the insertion of a job object in job queue 142 may not be required for all types of client requests. For example, a creation or removal of an alias for an existing model may not require the creation of a new job in such embodiments. In the embodiment shown in FIG. 1, clients 164 may be able to view at least a subset of the artifacts stored in repository 120, e.g., by issuing read requests 118 via programmatic interfaces 161.

A client request 111 may indicate one or more parameters that may be used by the MLS to perform the operations, such as a data source definition 150, a feature processing transformation recipe 152, or parameters 154 to be used for a particular machine learning algorithm. In some embodiments, artifacts respectively representing the parameters may also be stored in repository 120. Some machine learning workflows, which may correspond to a sequence of API requests from a client 164, may include the extraction and cleansing of input data records from raw data repositories 130 (e.g., repositories indicated in data source definitions 150) by input record handlers 160 of the MLS, as indicated by arrow 114. This first portion of the workflow may be initiated in response to a particular API invocation from a client 164, and may be executed using a first set of resources from pool 185. The input record handlers may, for example, perform such tasks as splitting the data records, sampling the data records, and so on, in accordance with a set of functions defined in an I/O library of the MLS. The input data may comprise data records that include variables of any of a variety of data types, such as, for example text, a numeric data type (e.g., real or integer), Boolean, a binary data type, a categorical data type, an image processing data type, an audio processing data type, a bioinformatics data type, a structured data type such as a data type compliant with the Unstructured Information Management Architecture (UIMA), and so on. In at least some embodiments, the input data reaching the MLS may be encrypted or compressed, and the MLS input data handling machinery may have to perform decryption or decompression before the input data records can be used for machine learning tasks. In some embodiments in which encryption is used, MLS clients may have to provide decryption metadata (e.g., keys, passwords, or other credentials) to the MLS to allow the MLS to decrypt data records. Similarly, an indication of the compression technique used may be provided by the clients in some implementations to enable the MLS to decompress the input data records appropriately. The output produced by the input record handlers may be fed to feature processors 162 (as indicated by arrow 115), where a set of transformation operations may be performed 162 in accordance with recipes 152 using another set of resources from pool 185. Any of a variety of feature processing approaches may be used depending on the problem domain: e.g., the recipes typically used for computer vision problems may differ from those used for voice recognition problems, natural language processing, and so on. The output 116 of the feature processing transformations may in turn be used as input for a selected machine learning algorithm 166, which may be executed in accordance with algorithm parameters 154 using yet another set of resources from pool 185. A wide variety of machine learning algorithms may be supported natively by the MLS libraries, including for example random forest algorithms, neural network algorithms, stochastic gradient descent algorithms, and the like. In at least one embodiment, the MLS may be designed to be extensible—e.g., clients may provide or register their own modules (which may be defined as user-defined functions) for input record handling, feature processing, or for implementing additional machine learning algorithms than are supported natively by the MLS. In some embodiments, some of the intermediate results (e.g., summarized statistics produced by the input record handlers) of a machine learning workflow may be stored in MLS artifact repository 120.

In the embodiment depicted in FIG. 1, the MLS may maintain knowledge base 122 containing information on best practices for various machine learning tasks. Entries may be added into the best practices KB 122 by various control-plane components of the MLS, e.g., based on metrics collected from server pools 185, feedback provided by clients 164, and so on. Clients 164 may be able to search for and retrieve KB entries via programmatic interfaces 161, as indicated by arrow 117, and may use the information contained in the entries to select parameters (such as specific recipes or algorithms to be used) for their request submissions. In at least some embodiments, new APIs may be implemented (or default values for API parameters may be selected) by the MLS on the basis of best practices identified over time for various types of machine learning practices.

Figure 2:
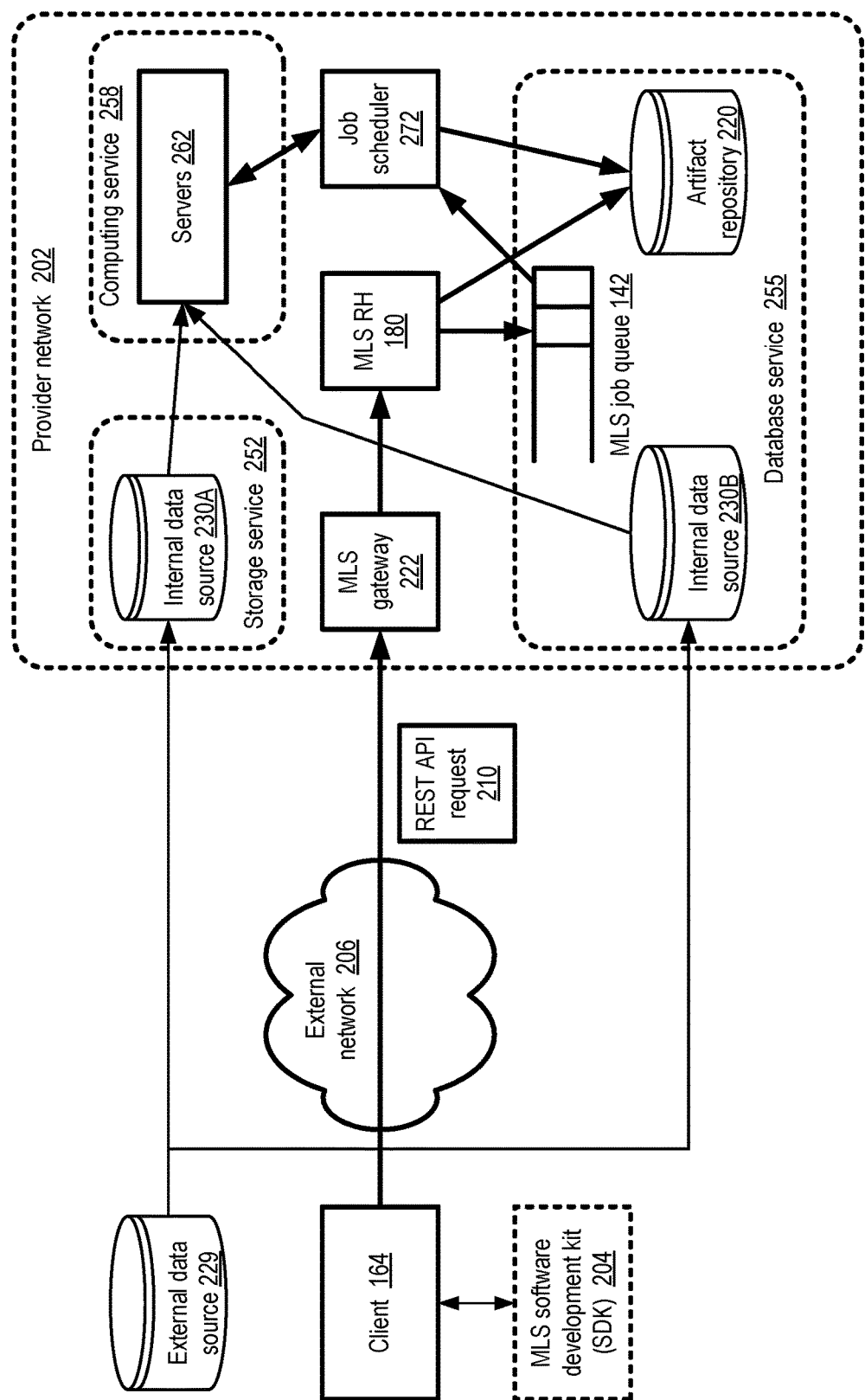
FIG. 2 illustrates an example of a machine learning service implemented using a plurality of network-accessible services of a provider network, according to at least some embodiments.

FIG. 2 illustrates an example of a machine learning service implemented using a plurality of network-accessible services of a provider network, according to at least some embodiments. Networks set up by an entity such as a company or a public sector organization to provide one or more services (such as various types of multi-tenant and/or single-tenant cloud-based computing or storage services) accessible via the Internet and/or other networks to a distributed set of clients may be termed provider networks herein. A given provider network may include numerous data centers hosting various resource pools, such as collections of physical and/or virtualized computer servers, storage devices, networking equipment and the like, needed to implement, configure and distribute the infrastructure and services offered by the provider. At least some provider networks and the corresponding network-accessible services may be referred to as "public clouds" and "public cloud services" respectively. Within large provider networks, some data centers may be located in different cities, states or countries than others, and in some embodiments the resources allocated to a given service such as the MLS may be distributed among several such locations to achieve desired levels of availability, fault-resilience and performance, as described below in greater detail with reference to FIG. 3.

In the embodiment shown in FIG. 2, the MLS utilizes storage service 202, computing service 258, and database service 255 of provider network 202. At least some of these services may also be used concurrently by other customers (e.g., other services implemented at the provider network, and/or external customers outside the provider network) in the depicted embodiment, i.e., the services may not be restricted to MLS use. MLS gateway 222 may be established to receive client requests 210 submitted over external network 206 (such as portions of the Internet) by clients 164. MLS gateway 222 may, for example, be configured with a set of publicly accessible IP (Internet Protocol) addresses that can be used to access the MLS. The client requests may be formatted in accordance with a representational state transfer (REST) API implemented by the MLS in some embodiments. In one embodiment, MLS customers may be provided an SDK (software development kit) 204 for local installation at client computing devices, and the requests 210 may be submitted from within programs written in conformance with the SDK. A client may also or instead access MLS functions from a compute server 262 of computing service 262 that has been allocated to the client in various embodiments.

Storage service 252 may, for example, implement a web services interface that can be used to create and manipulate unstructured data objects of arbitrary size. Database service 255 may implement either relational or non-relational databases. The storage service 252 and/or the database service 255 may play a variety of roles with respect to the MLS in the depicted embodiment. The MLS may require clients 164 to define data sources within the provider network boundary for their machine learning tasks in some embodiments. In such a scenario, clients may first transfer data from external data sources 229 into internal data sources within the provider network, such as internal data source 230A managed by storage service 252, or internal data source 230B managed by database service 255. In some cases, the clients of the MLS may already be using the provider network services for other applications, and some of the output of those applications (e.g., web server logs or video files), saved at the storage service 252 or the database service 255, may serve as the data sources for MLS workflows.

In response to at least some client requests 210, the MLS request handler 180 may generate and store corresponding job objects within a job queue 142, as discussed above. In the embodiment depicted in FIG. 2, the job queue 142 may itself be represented by a database object (e.g., a table) stored at database service 255. A job scheduler 272 may retrieve a job from queue 142, e.g., after checking that the job's dependency requirements have been met, and identify one or more servers 262 from computing service 258 to execute the job's computational operations. Input data for the computations may be read from the internal or external data sources by the servers 262. The MLS artifact repository 220 may be implemented within the database service 255 (and/or within the storage service 252) in various embodiments. In some embodiments, intermediate or final results of various machine learning tasks may also be stored within the storage service 252 and/or the database service 255.

Other services of the provider network, e.g., including load balancing services, parallel computing services, automated scaling services, and/or identity management services, may also be used by the MLS in some embodiments. A load balancing service may, for example, be used to automatically distribute computational load among a set of servers 262. A parallel computing service that implements the Map-reduce programming model may be used for some types of machine learning tasks. Automated scaling services may be used to add or remove servers assigned to a particular long-lasting machine learning task. Authorization and authentication of client requests may be performed with the help of an identity management service of the provider network in some embodiments.

In some embodiments a provider network may be organized into a plurality of geographical regions, and each region may include one or more availability containers, which may also be termed "availability zones". An availability container in turn may comprise portions or all of one or more distinct physical premises or data centers, engineered in such a way (e.g., with independent infrastructure components such as power-related equipment, cooling equipment, and/or physical security components) that the resources in a given availability container are insulated from failures in other availability containers. A failure in one availability container may not be expected to result in a failure in any other availability container; thus, the availability profile of a given physical host or server is intended to be independent of the availability profile of other hosts or servers in a different availability container.

In addition to their distribution among different availability containers, provider network resources may also be partitioned into distinct security containers in some embodiments. For example, while in general various types of servers of the provider network may be shared among different customers' applications, some resources may be restricted for use by a single customer. A security policy may be defined to ensure that specified group of resources (which may include resources managed by several different provider network services, such as a computing service, a storage service, or a database service, for example) are only used by a specified customer or a specified set of clients. Such a group of resources may be referred to as "security containers" or "security groups" herein.

Figure 3:
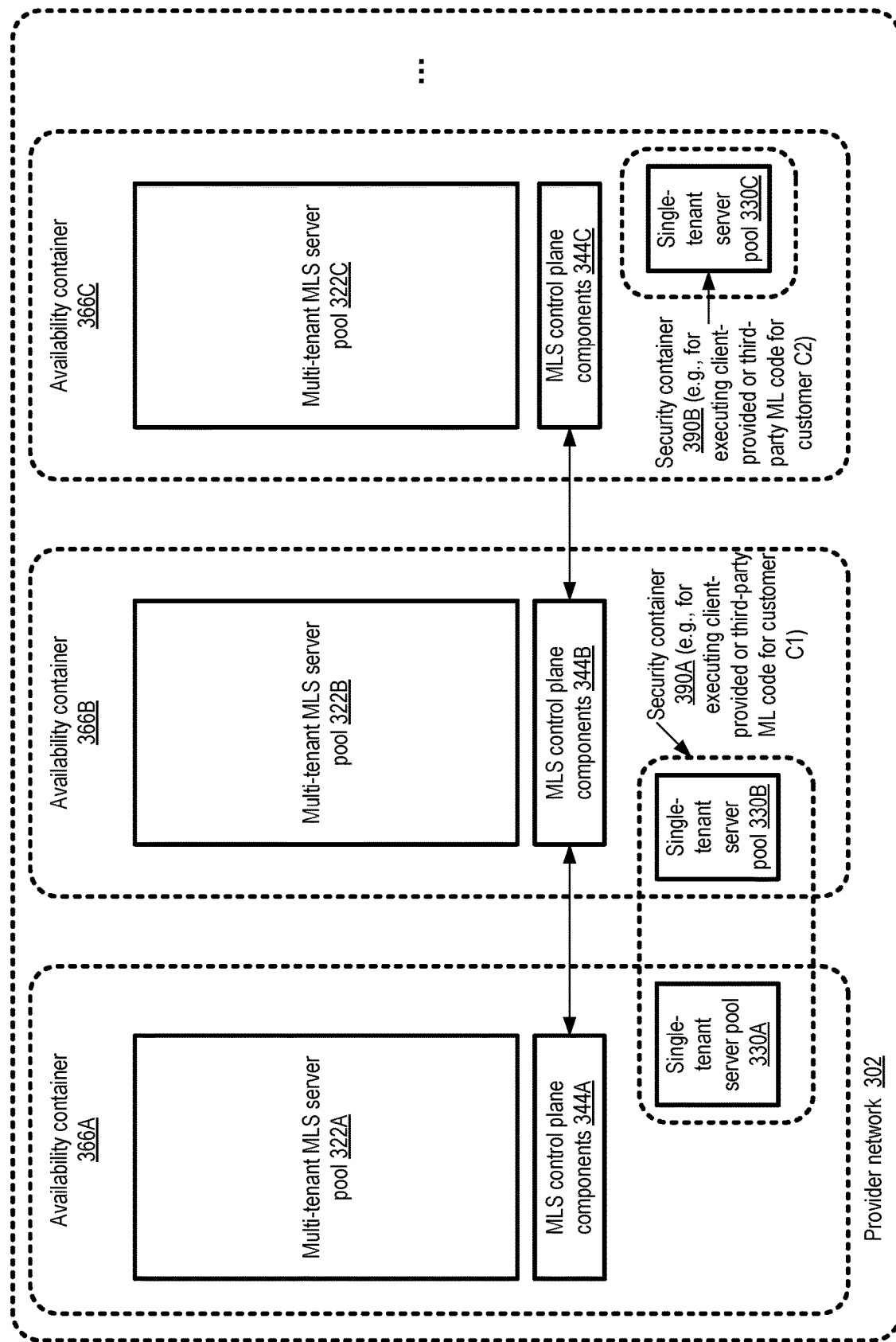
FIG. 3 illustrates an example of the use of a plurality of availability containers and security containers of a provider network for a machine learning service, according to at least some embodiments.

FIG. 3 illustrates an example of the use of a plurality of availability containers and security containers of a provider network for a machine learning service, according to at least some embodiments. In the depicted embodiment, provider network 302 comprises availability containers 366A, 366B and 366C, each of which may comprise portions or all of one or more data centers. Each availability container 366 has its own set of MLS control-plane components 344: e.g., control plane components 344A-344C in availability containers 366A-366C respectively. The control plane components in a given availability container may include, for example, an instance of an MLS request handler, one or more MLS job queues, a job scheduler, workload distribution components, and so on. The control plane components in different availability containers may communicate with each other as needed, e.g., to coordinate tasks that utilize resources at more than one data center. Each availability container 366 has a respective pool 322 (e.g., 322A-322C) of MLS servers to be used in a multi-tenant fashion. The servers of the pools 322 may each be used to perform a variety of MLS operations, potentially for different MLS clients concurrently. In contrast, for executing MLS tasks that require a higher level of security or isolation, single-tenant server pools that are designated for only a single client's workload may be used, such as single tenant server pools 330A, 330B and 330C. Pools 330A and 330B belong to security container 390A, while pool 330C is part of security container 390B. Security container 390A may be used exclusively for a customer C1 (e.g., to run customer-provided machine learning modules, or third-party modules specified by the customer), while security container 390B may be used exclusively for a different customer C2 in the depicted example.

In some embodiments, at least some of the resources used by the MLS may be arranged in redundancy groups that cross availability container boundaries, such that MLS tasks can continue despite a failure that affects MLS resources of a given availability container. For example, in one embodiment, a redundancy group RG1 comprising at least one server S1 in availability container 366A, and at least one server S2 in availability container 366B may be established, such that S1's MLS-related workload may be failed over to S2 (or vice versa). For long-lasting MLS tasks (such as tasks that involve terabyte or petabyte-scale data sets), the state of a given MLS job may be check-pointed to persistent storage (e.g., at a storage service or a database service of the provider network that is also designed to withstand single-availability-container failures) periodically, so that a failover server can resume a partially-completed task from the most recent checkpoint instead of having to start over from the beginning. The storage service and/or the database service of the provider network may inherently provide very high levels of data durability, e.g., using erasure coding or other replication techniques, so the data sets may not necessarily have to be copied in the event of a failure. In some embodiments, clients of the MLS may be able to specify the levels of data durability desired for their input data sets, intermediate data sets, artifacts, and the like, as well as the level of compute server availability desired. The MLS control plane may determine, based on the client requirements, whether resources in multiple availability containers should be used for a given task or a given client. The billing amounts that the clients have to pay for various MLS tasks may be based at least in part on their durability and availability requirements. In some embodiments, some clients may indicate to the MLS control-plane that they only wish to use resources within a given availability container or a given security container. For certain types of tasks, the costs of transmitting data sets and/or results over long distances may be so high, or the time required for the transmissions may so long, that the MLS may restrict the tasks to within a single geographical region of the provider network (or even within a single data center).

Processing Plans

Figure 4:
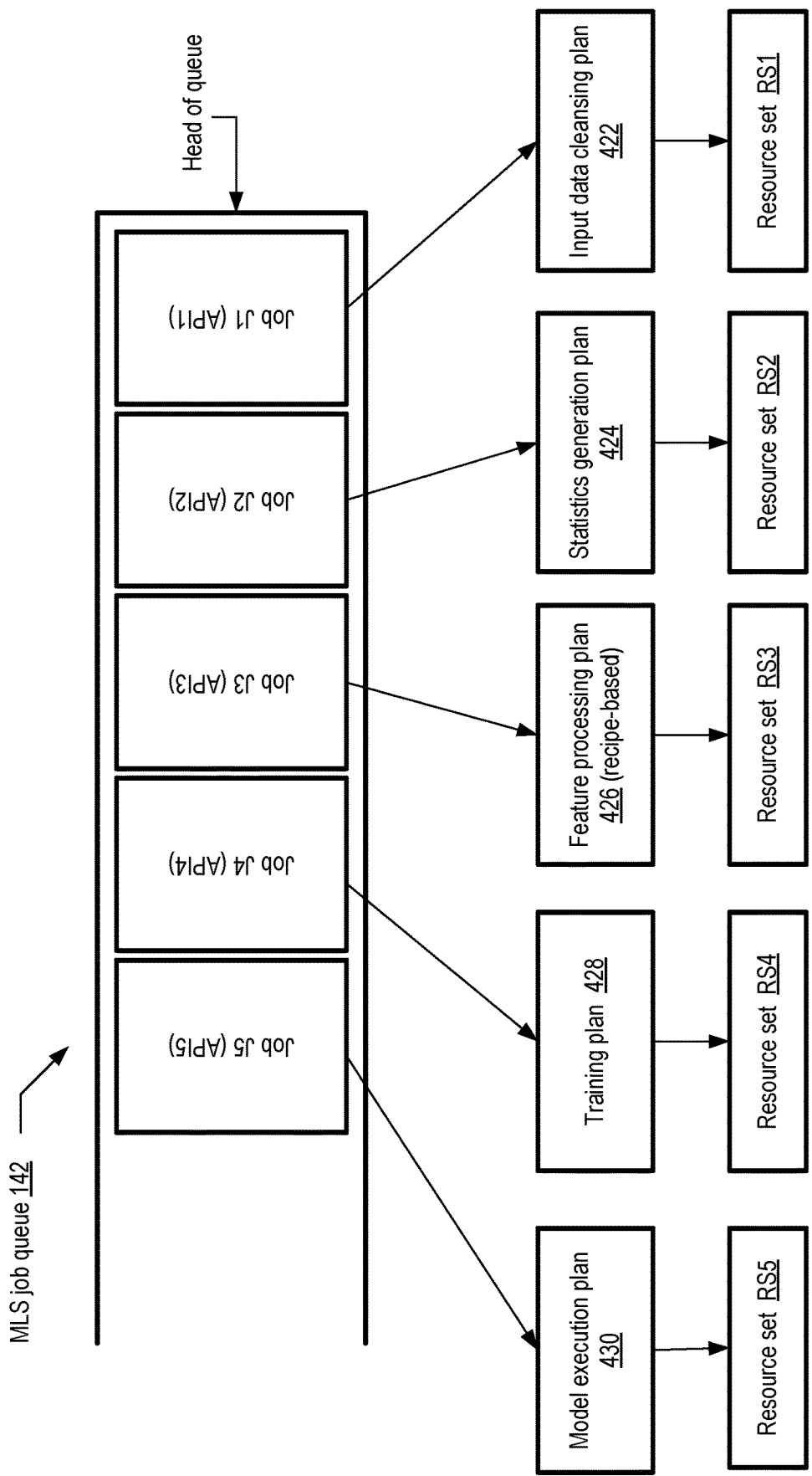
FIG. 4 illustrates examples of a plurality of processing plans and corresponding resource sets that may be generated at a machine learning service, according to at least some embodiments.

As mentioned earlier, the MLS control plane may be responsible for generating processing plans corresponding to each of the job objects generated in response to client requests in at least some embodiments. For each processing plan, a corresponding set of resources may then have to be identified to execute the plan, e.g., based on the workload distribution strategy selected for the plan, the available resources, and so on. FIG. 4 illustrates examples of various types of processing plans and corresponding resource sets that may be generated at a machine learning service, according to at least some embodiments.

In the illustrated scenario, MLS job queue 142 comprises five jobs, each corresponding to the invocation of a respective API by a client. Job J1 (shown at the head of the queue) was created in response to an invocation of API1. Jobs J2 through J5 were created respectively in response to invocations of API2 through API5. Corresponding to job J1, an input data cleansing plan 422 may be generated, and the plan may be executed using resource set RS1. The input data cleansing plan may include operations to read and validate the contents of a specified data source, fill in missing values, identify and discard (or otherwise respond to) input records containing errors, and so on. In some cases the input data may also have to be decompressed, decrypted, or otherwise manipulated before it can be read for cleansing purposes. Corresponding to job J2, a statistics generation plan 424 may be generated, and subsequently executed on resource set RS2. The types of statistics to be generated for each data attribute (e.g., mean, minimum, maximum, standard deviation, quantile binning, and so on for numeric attributes) and the manner in which the statistics are to be generated (e.g., whether all the records generated by the data cleansing plan 422 are to be used for the statistics, or a sub-sample is to be used) may be indicated in the statistics generation plan. The execution of job J2 may be dependent on the completion of job J1 in the depicted embodiment, although the client request that led to the generation of job J2 may have been submitted well before J1 is completed.

A recipe-based feature processing plan 426 corresponding to job J3 (and API3) may be generated, and executed on resource set RS3. Further details regarding the syntax and management of recipes are provided below. Job J4 may result in the generation of a model training plan 428 (which may in turn involve several iterations of training, e.g., with different sets of parameters). The model training may be performed using resource set RS4. Model execution plan 430 may correspond to job J5 (resulting from the client's invocation of API5), and the model may eventually be executed using resource set RS5. In some embodiments, the same set of resources (or an overlapping set of resources) may be used for performing several or all of a client's jobs—e.g., the resource sets RS1-RS5 may not necessarily differ from one another. In at least one embodiment, a client may indicate, e.g., via parameters included in an API call, various elements or properties of a desired processing plan, and the MLS may take such client preferences into account. For example, for a particular statistics generation job, a client may indicate that a randomly-selected sample of 25% of the cleansed input records may be used, and the MLS may generate a statistics generation plan that includes a step of generating a random sample of 25% of the data accordingly. In other cases, the MLS control plane may be given more freedom to decide exactly how a particular job is to be implemented, and it may consult its knowledge base of best practices to select the parameters to be used.

Job Scheduling

Figure 5:
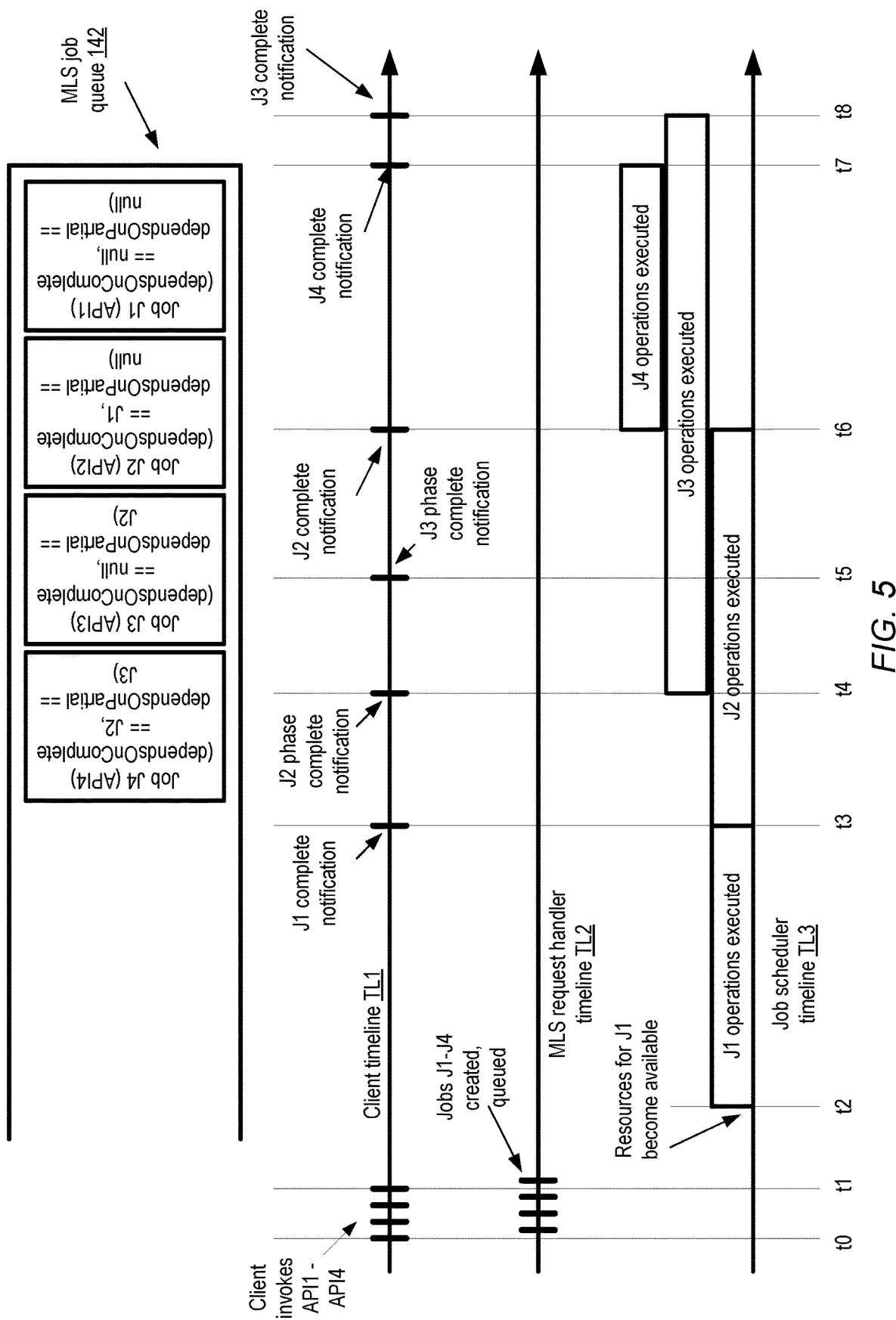
FIG. 5 illustrates an example of asynchronous scheduling of jobs at a machine learning service, according to at least some embodiments.

FIG. 5 illustrates an example of asynchronous scheduling of jobs at a machine learning service, according to at least some embodiments. In the depicted example, a client has invoked four MLS APIs, API1 through API4, and four corresponding job objects J1 through J4 are created and placed in job queue 142. Timelines TL1, TL2, and TL3 show the sequence of events from the perspective of the client that invokes the APIs, the request handler that creates and inserts the jobs in queue 142, and a job scheduler that removes the jobs from the queue and schedules the jobs at selected resources.

In the depicted embodiment, in addition to the base case of no dependency on other jobs, two types of inter-job dependencies may be supported. In one case, termed "completion dependency", the execution of one job Jp cannot be started until another job Jq is completed successfully (e.g., because the final output of Jq is required as input for Jp). Full dependency is indicated in FIG. 5 by the parameter "dependsOnComplete" shown in the job objects—e.g., J2 is dependent on J1 completing execution, and J4 depends on J2 completing successfully. In the other type of dependency, the execution of one job Jp may be started as soon as some specified phase of another job Jq is completed. This latter type of dependency may be termed a "partial dependency", and is indicated in FIG. 5 by the "dependsOnPartial" parameter. For example, J3 depends on the partial completion of J2, and J4 depends on the partial completion of J3. It is noted that in some embodiments, to simplify the scheduling, such phase-based dependencies may be handled by splitting a job with N phases into N smaller jobs, thereby converting partial dependencies into full dependencies. J1 has no dependencies of either type in the depicted example.

As indicated on client timeline TL1, API1 through API4 may be invoked within the time period t0 to t1. Even though some of the operations requested by the client depend on the completion of operations corresponding to earlier-invoked APIs, the MLS may allow the client to submit the dependent operation requests much earlier than the processing of the earlier-invoked APIs' jobs in the depicted embodiment. In at least some embodiments, parameters specified by the client in the API calls may indicate the inter-job dependencies. For example, in one implementation, in response to API1, the client may be provided with a job identifier for J1, and that job identifier may be included as a parameter in API2 to indicate that the results of API1 are required to perform the operations corresponding to API2. As indicated by the request handler's timeline TL2, the jobs corresponding to each API call may be created and queued shortly after the API is invoked. Thus, all four jobs have been generated and placed within the job queue 142 by a short time after t1.

As shown in the job scheduler timeline TL3, job J1 may be scheduled for execution at time t2. The delay between the insertion of J1 in queue 142 (shortly after t0) and the scheduling of J1 may occur for a number of reasons in the depicted embodiment—e.g., because there may have been other jobs ahead of J1 in the queue 142, or because it takes some time to generate a processing plan for J1 and identify the resources to be used for J1, or because enough resources were not available until t2. J1's execution lasts until t3. In the depicted embodiment, when J1 completes, (a) the client is notified and (b) J2 is scheduled for execution. As indicated by J2's dependsOnComplete parameter value, J2 depends on J1's completion, and J2's execution could therefore not have been begun until t3, even if J2's processing plan were ready and J2's resource set had been available prior to t3.

As indicated by J3's "dependsOnPartial" parameter value, J3 can be started when a specified phase or subset of J2's work is complete in the depicted example. The portion of J2 upon which J3 depends completes at time t4 in the illustrated example, and the execution of J3 therefore begins (in parallel with the execution of the remaining portion of J2) at t4. In the depicted example, the client may be notified at time t4 regarding the partial completion of J2 (e.g., the results of the completed phase of J2 may be provided to the client).

At t5, the portion of J3 on which J4 depends may be complete, and the client may be notified accordingly. However, J4 also depends on the completion of J2, so J4 cannot be started until J2 completes at t6. J3 continues execution until t8. J4 completes at t7, earlier than t8. The client is notified regarding the completion of each of the jobs corresponding to the respective API invocations API1-API4 in the depicted example scenario. In some embodiments, partial dependencies between jobs may not be supported—instead, as mentioned earlier, in some cases such dependencies may be converted into full dependencies by splitting multi-phase jobs into smaller jobs. In at least one implementation, instead of or in addition to being notified when the jobs corresponding to the API invocations are complete (or when phases of the jobs are complete), clients may be able to submit queries to the MLS to determine the status (or the extent of completion) of the operations corresponding to various API calls. For example, an MLS job monitoring web page may be implemented, enabling clients to view the progress of their requests (e.g., via a "percent complete" indicator for each job), expected completion times, and so on. In some embodiments, a polling mechanism may be used by clients to determine the progress or completion of the jobs.

MLS Artifacts

Figure 6:
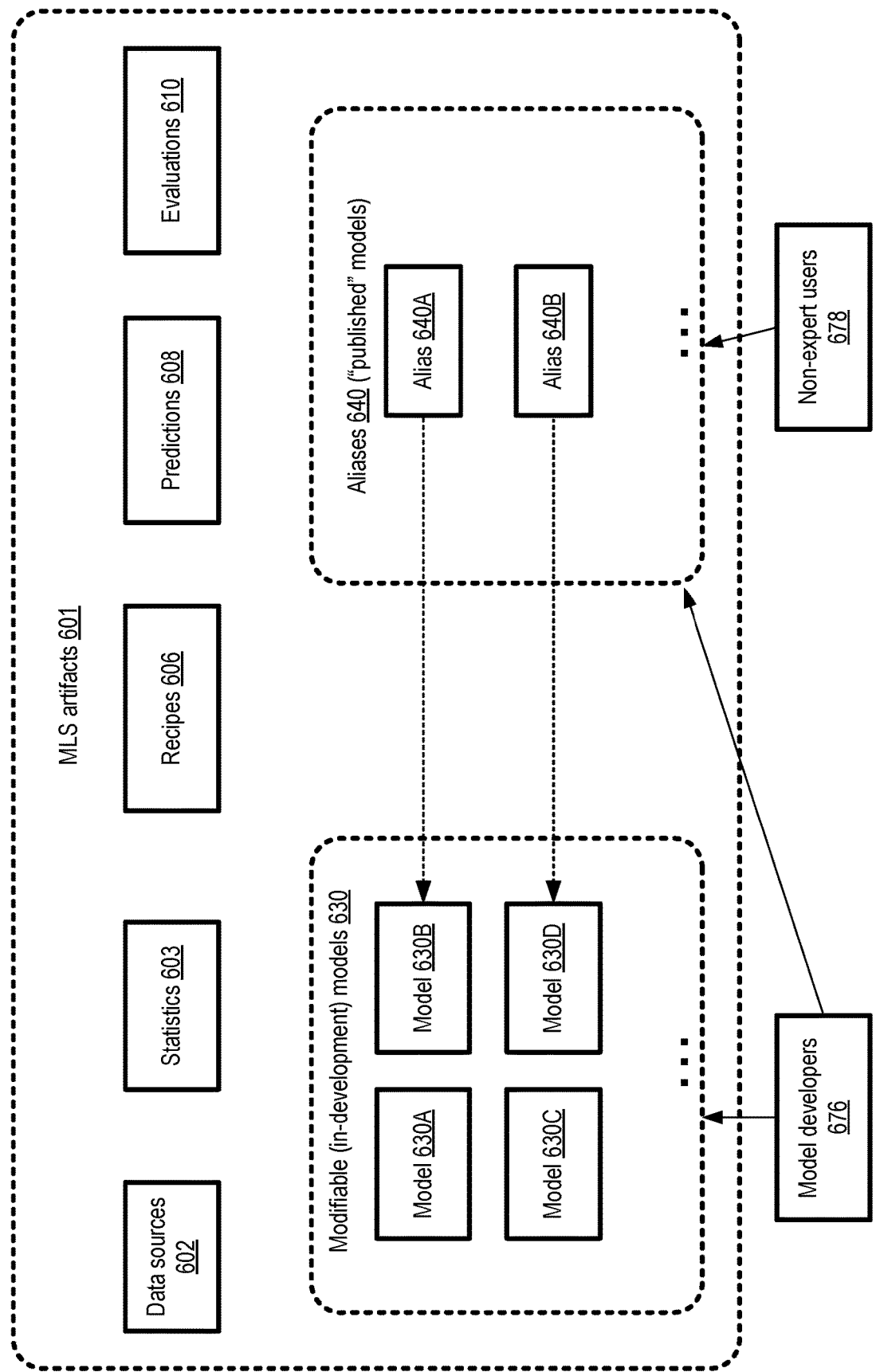
FIG. 6 illustrates example artifacts that may be generated and stored using a machine learning service, according to at least some embodiments.

FIG. 6 illustrates example artifacts that may be generated and stored using a machine learning service, according to at least some embodiments. In general, MLS artifacts may comprise any of the objects that may be stored in a persistent manner as a result of an invocation of an MLS programmatic interface. In some implementations, some API parameters (e.g., text versions of recipes) that are passed to the MLS may be stored as artifacts. As shown, in the depicted embodiment, MLS artifacts 601 may include, among others, data sources 602, statistics 603, feature processing recipes 606, model predictions 608, evaluations 610, modifiable or in-development models 630, and published models or aliases 640. In some implementations the MLS may generate a respective unique identifier for each instance of at least some of the types of artifacts shown and provide the identifiers to the clients. The identifiers may subsequently be used by clients to refer to the artifact (e.g., in subsequent API calls, in status queries, and so on).

A client request to create a data source artifact 602 may include, for example, an indication of an address or location from which data records can be read, and some indication of the format or schema of the data records. For example, an indication of a source URI (universal resource identifier) to which HTTP GET requests can be directed to retrieve the data records, an address of a storage object at a provider network storage service, or a database table identifier may be provided. The format (e.g., the sequence and types of the fields or columns of the data records) may be indicated in some implementations via a separate comma separated variable (csv) file. In some embodiments, the MLS may be able to deduce at least part of the address and/or format information needed to create the data source artifact—e.g., based on the client's identifier, it may be possible to infer the root directory or root URI of the client's data source, and based on an analysis of the first few records, it may be possible to deduce at least the data types of the columns of the schema. In some embodiments, the client request to create a data source may also include a request to re-arrange the raw input data, e.g., by sampling or splitting the data records using an I/O library of the MLS. When requesting a creation of a data source, in some implementations clients may also be required to provide security credentials that can be used by the MLS to access the data records.

Figure 7:
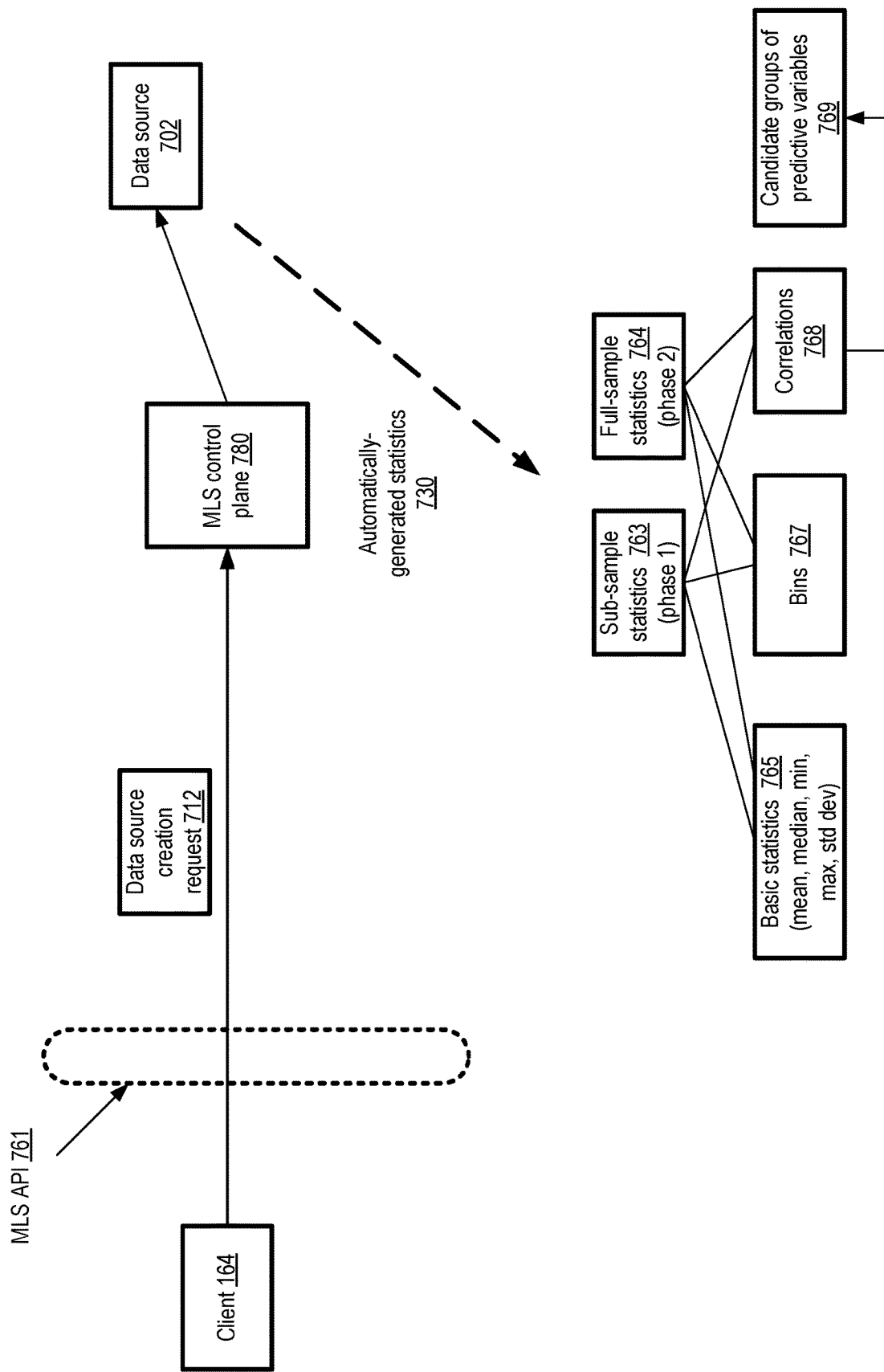
FIG. 7 illustrates an example of automated generation of statistics in response to a client request to instantiate a data source, according to at least some embodiments.

In some embodiments, as described in further detail below with respect to FIG. 7, at least some statistics 603 may be generated automatically for the data records of a data source. In other embodiments, the MLS may also or instead enable clients to explicitly request the generation of various types of statistics, e.g., via the equivalent of a createStatistics(dataSourceID, statisticsDescriptor) request in which the client indicates the types of statistics to be generated for a specified data source. The types of statistics artifacts that are generated may vary based on the data types of the input record variables—e.g., for numeric variables, the mean, median, minimum, maximum, standard deviation, quantile bins, number of nulls or "not-applicable" values and the like may be generated. Cross-variable statistics such as correlations may also be generated, either automatically or on demand, in at least some embodiments.

Recipes 606 comprising feature processing transformation instructions may be provided by a client (or selected from among a set of available recipes accessible from an MLS recipe collection) in some embodiments. A recipe language allowing clients to define groups of variables, assignments, dependencies upon other artifacts such as models, and transformation outputs may be supported by the MLS in such embodiments, as described below in greater detail. Recipes submitted in text form may be compiled into executable versions and re-used on a variety of data sets in some implementations.

At least two types of artifacts representing machine learning models or predictors may be generated and stored in the depicted embodiment. Often, the process of developing and refining a model may take a long time, as the developer may try to improve the accuracy of the predictions using a variety of data sets and a variety of parameters. Some models may be improved over a number of weeks or months, for example. In such scenarios it may be worthwhile to enable other users (e.g., business analysts) to utilize one version of a model, while model developers continue to generate other, improved versions. Accordingly, the artifacts representing models may belong to one of two categories in some embodiments: modifiable models 630, and published models or aliases 640. An alias may comprise an alias name or identifier, and a pointer to a model (e.g., alias 640A points to model 630B, and alias 640B points to model 630D in the depicted embodiment). As used herein, the phrase "publishing a model" refers to making a particular version of a model executable by a set of users by reference to an alias name or identifier. In some cases, at least some of the users of the set may not be permitted to modify the model or the alias. Non-expert users 678 may be granted read and execute permissions to the aliases, while model developers 676 may also be allowed to modify models 630 (and/or the pointers of the aliases 640) in some embodiments. In some embodiments, a set of guarantees may be provided to alias users: e.g., that the format of the input and output of an alias (and the underlying model referred to by the alias) will not change once the alias is published, and that the model developers have thoroughly tested and validated the underlying model pointed to by the alias. In addition, a number of other logical constraints may be enforced with respect to aliases in such embodiments. For example, if the alias is created for a model used in online mode (model usage modes are described in further detail below with respect to FIG. 8), the MLS may guarantee that the model pointed to remains online (i.e., the model cannot be un-mounted). In some implementations a distinction may be drawn between aliases that are currently in production mode and those that are in internal-use or test mode, and the MLS may ensure that the underlying model is not deleted or un-mounted for an alias in production mode. When creating aliases to online-mode models, a minimum throughput rate of predictions/evaluations may be determined for the alias, and the MLS may ensure that the resources assigned to the model can meet the minimum throughput rate in some embodiments. After model developers 676 improve the accuracy and/or performance characteristics of a newer version of a model 630 relative to an older version for which an alias 640 has been created, they may switch the pointer of the alias so that it now points to the improved version. Thus, non-expert users may not have to change anything in the way that they have been using the aliases, while benefiting from the improvements. In some embodiments, alias users may be able to submit a query to learn when the underlying model was last changed, or may be notified when they request an execution of an alias that the underlying model has been changes since the last execution.

Results of model executions, such as predictions 608 (values predicted by a model for a dependent variable in a scenario in which the actual values of the independent variable are not known) and model evaluations 610 (measures of the accuracy of a model, computed when the predictions of the model can be compared to known values of dependent variables) may also be stored as artifacts by the MLS in some embodiments. In addition to the artifact types illustrated in FIG. 6, other artifact types may also be supported in some embodiments—e.g., objects representing network endpoints that can be used for real-time model execution on streaming data (as opposed to batch-mode execution on a static set of data) may be stored as artifacts in some embodiments, and client session logs (e.g., recordings of all the interactions between a client and the MLS during a given session) may be stored as artifacts in other embodiments.

In some embodiments, the MLS may support recurring scheduling of related jobs. For example, a client may create an artifact such as a model, and may want that same model to be re-trained and/or re-executed for different input data sets (e.g., using the same configuration of resources for each of the training or prediction iterations) at specified points in time. In some cases the points in time may be specified explicitly (e.g., by the client requesting the equivalent of "re-run model M1 on the currently available data set at data source DS1 at 11:00, 15:00 and 19:00 every day"). In other cases the client may indicate the conditions under which the iterations are to be scheduled (e.g., by the client requesting the equivalent of "re-run model M1 whenever the next set of 1000000 new records becomes available from data source DS1"). A respective job may be placed in the MLS job queue for each recurring training or execution iteration. The MLS may implement a set of programmatic interface enabling such scheduled recurring operations in some embodiments. Using such an interface, a client may specify a set of model/alias/recipe artifacts (or respective versions of the same underling artifact) to be used for each of the iterations, and/or the resource configurations to be used. Such programmatic interfaces may be referred to as "pipelining APIs" in some embodiments. In addition to the artifact types shown in FIG. 6, pipeline artifacts may be stored in the MLS artifact repository in some embodiments, with each instance of a pipeline artifact representing a named set of recurring operations requested via such APIs. In one embodiment, a separately-managed data pipelining service implemented at the provider network may be used in conjunction with the MLS for supporting such recurrent operations.

As mentioned above, in some embodiments, the MLS may automatically generate statistics when a data source is created. FIG. 7 illustrates an example of automated generation of statistics in response to a client request to instantiate a data source, according to at least some embodiments. As shown, a client 764 submits a data source creation request 712 to the MLS control plane 780 via an MLS API 761. The creation request may specify an address or location from which data records can be retrieved, and optionally a schema or format document indicating the columns or fields of the data records.

In response to receiving request 712, the MLS control plane 780 may generate and store a data source artifact 702 in the MLS artifact repository. In addition, and depending in some cases on the current availability of resources at the MLS, the MLS may also initiate the generation of one or more statistics objects 730 in the depicted embodiment, even if the client request did not explicitly request such statistics. Any combination of a number of different types of statistics may be generated automatically in one of two modes in various embodiments. For example, for very large data sets, an initial set of statistics 763 based on a sub-sample (e.g., a randomly-selected subset of the large data set) may be obtained in a first phase, while the generation of full-sample statistics 764 derived from the entire data set may be deferred to a second phase. Such a multi-phase approach towards statistics generation may be implemented, for example, to allow the client to get a rough or approximate summary of the data set values fairly rapidly in the first phase, so that the client may begin planning subsequent machine learning workflow steps without waiting for a statistical analysis of the complete data set.

As shown, a variety of different statistics may be obtained in either phase. For numeric variables, basic statistics 765 may include the mean, median, minimum, maximum, and standard deviation. Numeric variables may also be binned (categorized into a set of ranges such as quartiles or quintiles); such bins 767 may be used for the construction of histograms that may be displayed to the client. Depending on the nature of the distribution of the variable, either linear or logarithmic bin boundaries may be selected. In some embodiments, correlations 768 between different variables may be computed as well. In at least one embodiment, the MLS may utilize the automatically generated statistics (such as the correlation values) to identify candidate groups 769 of variables that may have greater predictive power than others. For example, to avoid over-fitting for certain classes of models, only one variable among a set of variables that correlate very strongly with one another may be recommended as a candidate for input to a model. In such scenarios, the client may be able to avoid the time and effort required to explore the significance of other variables. In many problem domains in which a given data record may have hundreds or even thousands of variables, such an automated selection of candidate variables expected to have greater predictive effectiveness may be very valuable to clients of the MLS.

Figure 8:
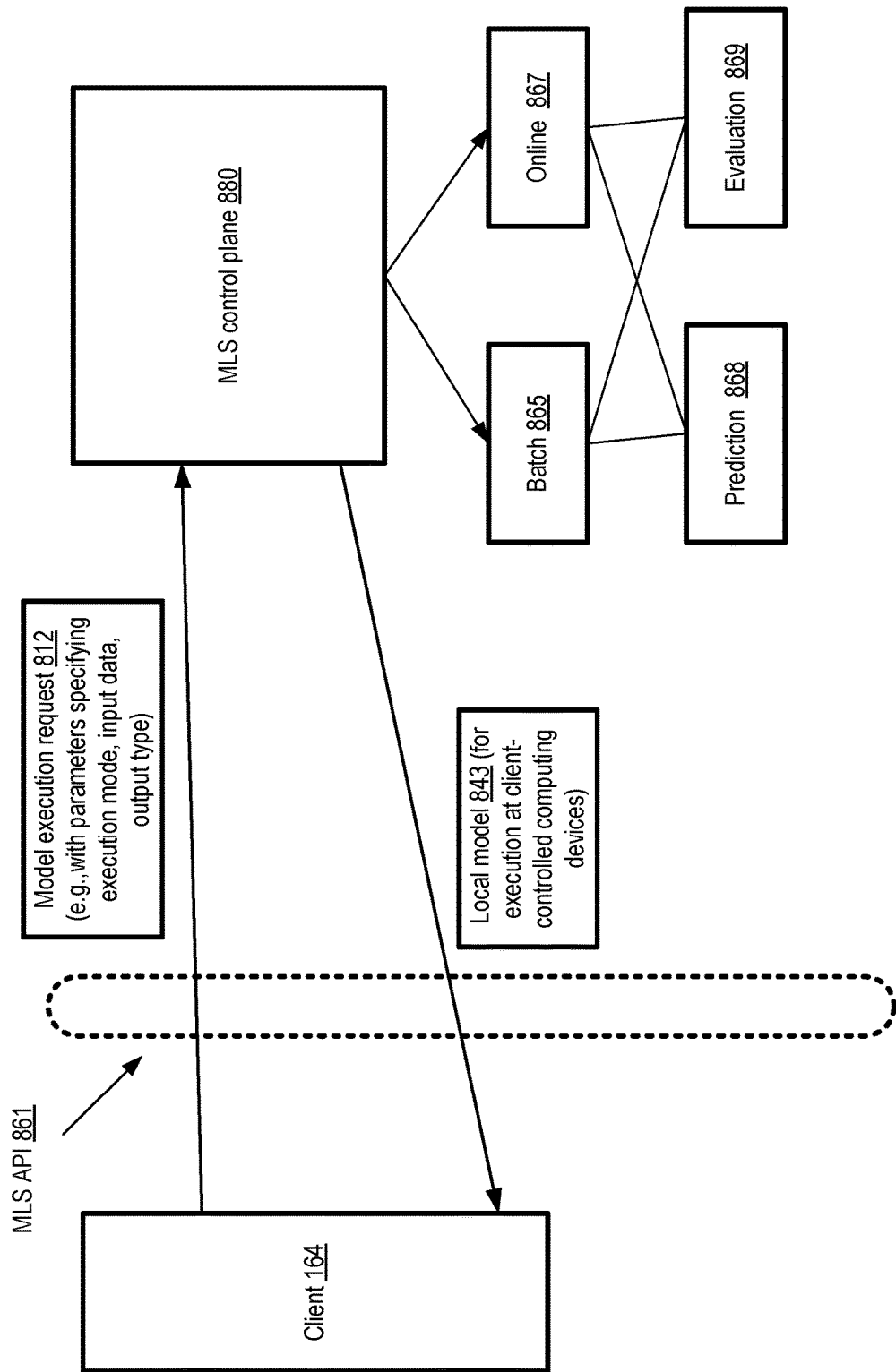
FIG. 8 illustrates several model usage modes that may be supported at a machine learning service, according to at least some embodiments.

FIG. 8 illustrates several model usage modes that may be supported at a machine learning service, according to at least some embodiments. Model usage modes may be broadly classified into three categories: batch mode, online or real-time mode, and local mode. In batch mode, a given model may be run on a static set of data records. In real-time mode, a network endpoint (e.g., an IP address) may be assigned as a destination to which input data records for a specified model are to be submitted, and model predictions may be generated on groups of streaming data records as the records are received. In local mode, clients may receive executable representations of a specified model that has been trained and validated at the MLS, and the clients may run the models on computing devices of their choice (e.g., at devices located in client networks rather than in the provider network where the MLS is implemented).

In the depicted embodiment, a client 164 of the MLS may submit a model execution request 812 to the MLS control plane 180 via a programmatic interface 861. The model execution request may specify the execution mode (batch, online or local), the input data to be used for the model run (which may be produced using a specified data source or recipe in some cases), the type of output (e.g., a prediction or an evaluation) that is desired, and/or optional parameters (such as desired model quality targets, minimum input record group sizes to be used for online predictions, and so on). In response the MLS may generate a plan for model execution and select the appropriate resources to implement the plan. In at least some embodiments, a job object may be generated upon receiving the execution request 812 as described earlier, indicating any dependencies on other jobs (such as the execution of a recipe for feature processing), and the job may be placed in a queue. For batch mode 865, for example, one or more servers may be identified to run the model. For online mode 867, the model may be mounted (e.g., configured with a network address) to which data records may be streamed, and from which results including predictions 868 and/or evaluations 869 can be retrieved. In at least one embodiment, clients may optionally specify expected workload levels for a model that is to be instantiated in online mode, and the set of provider network resources to be deployed for the model may be selected in accordance with the expected workload level. For example, a client may indicate via a parameter of the model execution/creation request that up to 100 prediction requests per day are expected on data sets of 1 million records each, and the servers selected for the model may be chosen to handle the specified request rate. For local mode, the MLS may package up an executable local version 843 of the model (where the details of the type of executable that is to be provided, such as the type of byte code or the hardware architecture on which the model is to be run, may have been specified in the execution request 812) and transmit the local model to the client. In some embodiments, only a subset of the execution modes illustrated may be supported. In some implementations, not all of the combinations of execution modes and output types may be supported—for example, while predictions may be supported for online mode in one implementation, evaluations may not be supported for online mode.

Methods for Implementing MLS Operations

Figure 9B:
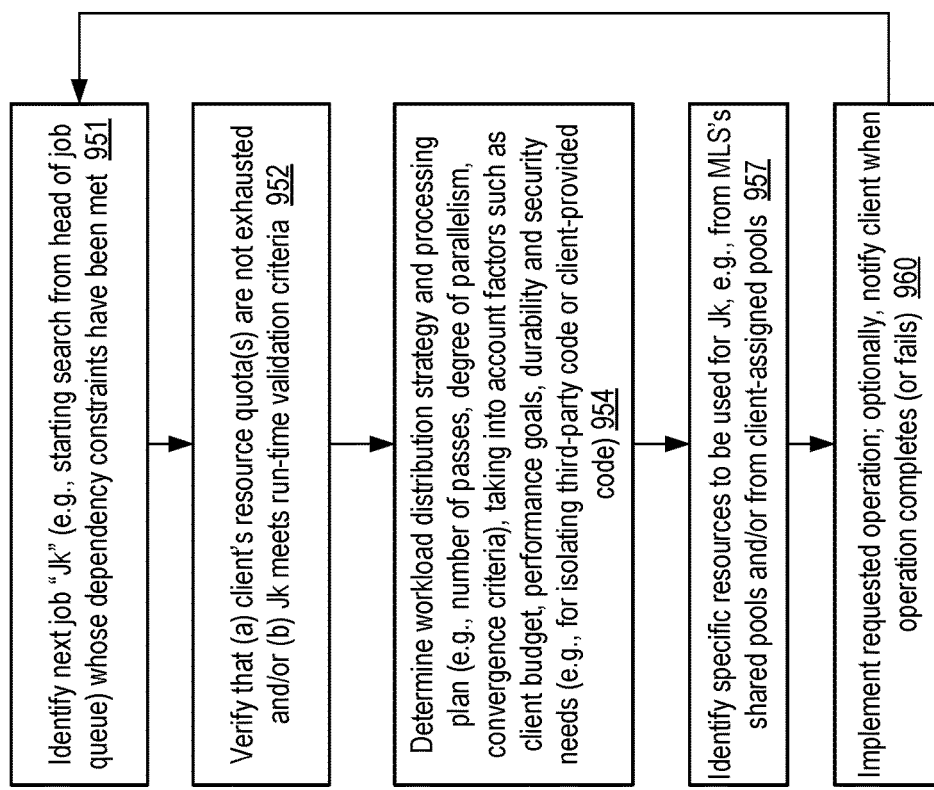
FIGS. 9a and 9b are flow diagrams illustrating aspects of operations that may be performed at a machine learning service that supports asynchronous scheduling of machine learning jobs, according to at least some embodiments.
Figure 9A:
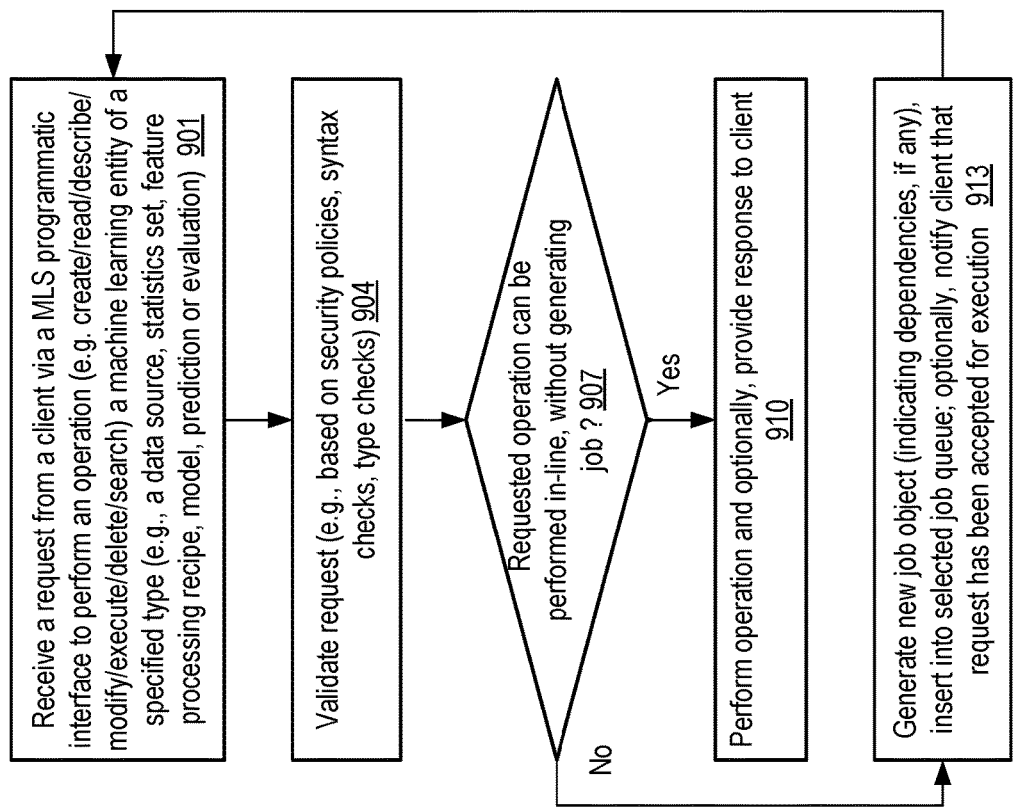

FIGS. 9a and 9b are flow diagrams illustrating aspects of operations that may be performed at a machine learning service that supports asynchronous scheduling of machine learning jobs, according to at least some embodiments. As shown in element 901 of FIG. 9a, the MLS may receive a request from a client via a programmatic interface (such as an API, a command-line tool, a web page, or a custom GUI) to perform a particular operation on an entity belonging to a set of supported entity types of the MLS. The entity types may include, for example, data sources, statistics, feature processing recipes, models, aliases, predictions, and/or evaluations in the depicted embodiment. The operations requested may include, for example, create, read (or describe the attributes of), modify/update attributes, execute, search, or delete operations. Not all the operation types may apply to all the entity types in some embodiments—e.g., it may not be possible to "execute" a data source. In at least some implementations, the request may be encrypted or encapsulated by the client, and the MLS may have to extract the contents of the request using the appropriate keys and/or certificates.

The request may next be validated in accordance with various rules or policies of the MLS (element 904). For example, in accordance with a security policy, the permissions, roles or capabilities granted to the requesting client may be checked to ensure that the client is authorized to have the requested operations performed. The syntax of the request itself, and/or objects such as recipes passed as request parameters may be checked for some types of requests. In some cases, the types of one or more data variables indicated in the request may have to be checked as well.

If the request passes the validation checks, a decision may be made as to whether a job object is to be created for the request. As mentioned earlier, in some cases, the amount of work required may be small enough that the MLS may simply be able to perform the requested operation synchronously or "in-line", instead of creating and inserting a job object into a queue for asynchronous execution (at least in scenarios in which the prerequisites or dependencies of the request have already been met, and sufficient resources are available for the MLS to complete the requested work). If an analysis of the request indicates that a job is required (as detected in element 907), a job object may be generated, indicating the nature of the lower-level operations to be performed at the MLS as well as any dependencies on other jobs, and the job object may be placed in a queue (element 913). In some implementations, the requesting client may be notified that the request has been accepted for execution (e.g., by indicating to the client that a job has been queued for later execution). The client may submit another programmatic request without waiting for the queued job to be completed (or even begun) in some cases. If the job does not have any dependencies that have yet to be met, and meets other criteria for immediate or in-line execution (as also determined in element 907), the requested operation may be performed without creating a job object (element 910) and the results may optionally be provided to the requesting client. Operations corresponding to elements 901-913 may be performed for each request that is received via the MLS programmatic interface. At some point after a particular job Jk is placed in the queue, Jk may be identified (e.g., by a job scheduler component of the MLS control plane) as the next job to be implemented (element 951 of FIG. 9b). To identify the next job to be implemented, the scheduler may, for example, start from the head of the queue (the earliest-inserted job that has not yet been executed) and search for jobs whose dependencies (if any are specified) have been met.

In addition to the kinds of validation indicated in element 904 of FIG. 9a, the MLS may perform validations at various other stages in some embodiments, e.g., with the general goals of (a) informing clients as soon as possible when a particular request is found to be invalid, and (b) avoiding wastage of MLS resources on requests that are unlikely to succeed. As shown in element 952 of FIG. 9b, one or more types of validation checks may be performed on the job Jk identified in element 951. For example, in one embodiment each client may have a quota or limit on the resources that can be applied to their jobs (such as a maximum number of servers that can be used concurrently for all of a given customer's jobs, or for any given job of the customer). In some implementations respective quotas may be set for each of several different resource types—e.g., CPUs/cores, memory, disk, network bandwidth and the like. In such scenarios, the job scheduler may be responsible for verifying that the quota or quotas of the client on whose behalf the job Jk is to be run have not been exhausted. If a quota has been exhausted, the job's execution may be deferred until at least some of the client's resources are released (e.g., as a result of a completion of other jobs performed on the same client's behalf). Such constraint limits may be helpful in limiting the ability of any given client to monopolize shared MLS resources, and also in minimizing the negative consequences of inadvertent errors or malicious code. In addition to quota checks, other types of run-time validations may be required for at least some jobs—e.g., data type checking may have to be performed on the input data set for jobs that involve feature processing, or the MLS may have to verify that the input data set size is within acceptable bounds. Thus, client requests may be validated synchronously (at the time the request is received, as indicated in element 904 of FIG. 9a) as well as asynchronously (as indicated in element 952 of FIG. 9b) in at least some embodiments. A workload distribution strategy and processing plan may be identified for Jk—e.g., the number of processing passes or phases to be used, the degree of parallelism to be used, an iterative convergence criterion to be used for completing Jk (element 954). A number of additional factors may be taken into account when generating the processing plan in some embodiments, such as client budget constraints (if any), the data durability needs of the client, the performance goals of the client, security needs (such as the need to run third-party code or client-provided code in isolation instead of in multi-tenant mode).

In accordance with the selected distribution strategy and processing plan, a set of resources may be identified for Jk (element 957). The resources (which may include compute servers or clusters, storage devices, and the like) may be selected from the MLS-managed shared pools, for example, and/or from customer-assigned or customer-owned pools. JK's operations may then be performed on the identified resources (element 960), and the client on whose behalf Jk was created may optionally be notified when the operations complete (or in the event of a failure that prevents completion of the operations).

Idempotent Programmatic Interfaces

Some of the types of operations requested by MLS clients may be resource-intensive. For example, ingesting a terabyte-scale data set (e.g., in response to a client request to create a data store) or generating statistics on such a data set may take hours or days, depending on the set of resources deployed and the extent of parallelism used. Given the asynchronous manner in which client requests are handled in at least some embodiments, clients may sometimes end up submitting the same request multiple times. In some cases, such multiple submissions may occur because the client is unaware whether the previous submission was accepted or not (e.g., because the client failed to notice an indication that the previous submission was accepted, or because such an indication was lost). In other cases, a duplicate request may be received because the client has assumed that since the expected results of completing the requested task have not been provided for a long time, the previous request must have failed. If, in response to such a duplicate submission, the MLS actually schedules another potentially large job, resources may be deployed unnecessarily and the client may in some cases be billed twice for a request that was only intended to be serviced once. Accordingly, in order to avoid such problematic scenarios, in at least one embodiment one or more of the programmatic interfaces supported by the MLS may be designed to be idempotent, such that the re-submission of a duplicate request by the same client does not have negative consequences.

Figure 10A:
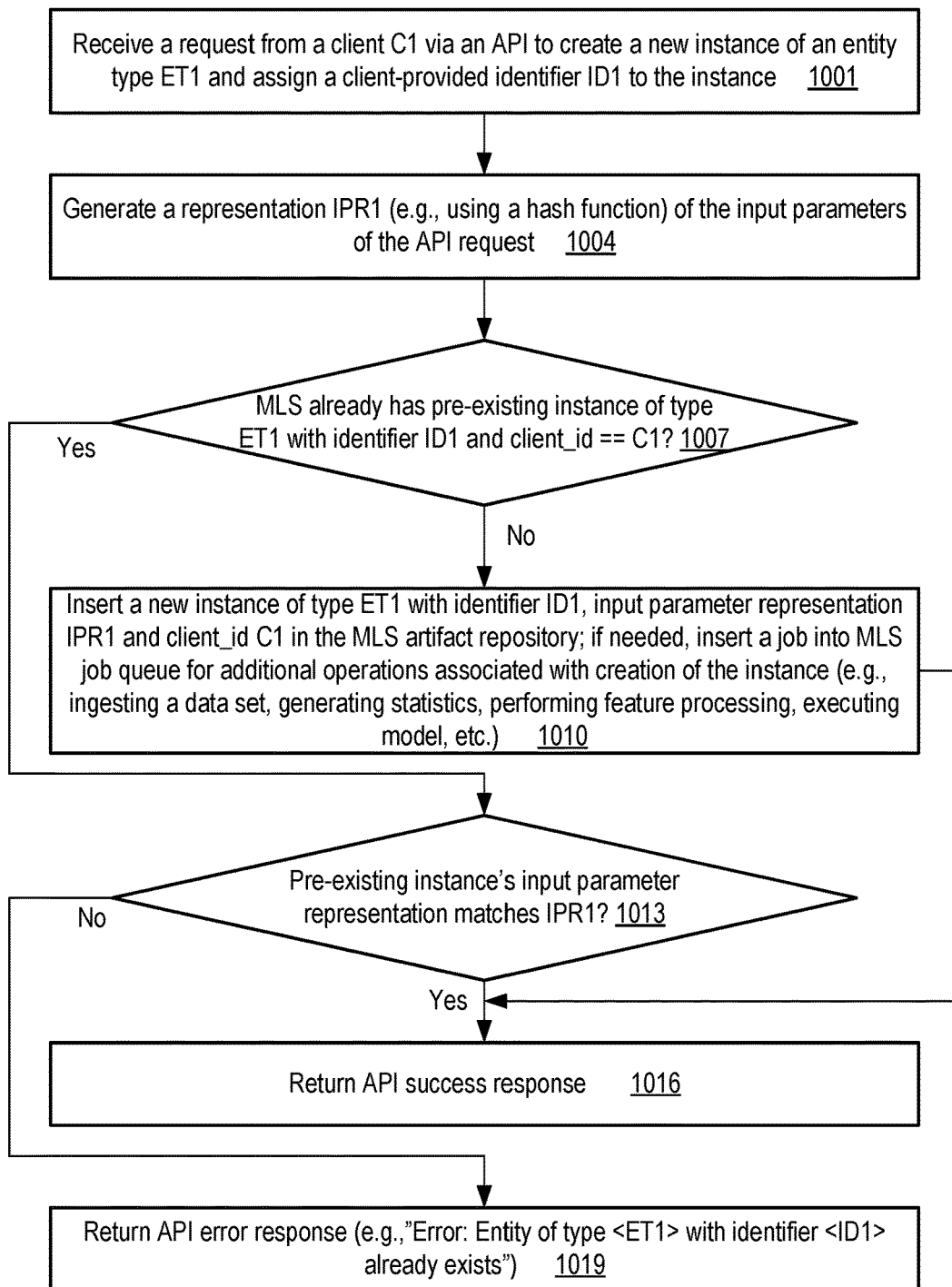
FIG. 10a is a flow diagram illustrating aspects of operations that may be performed at a machine learning service at which a set of idempotent programmatic interfaces are supported, according to at least some embodiments.

FIG. 10a is a flow diagram illustrating aspects of operations that may be performed at a machine learning service at which a set of idempotent programmatic interfaces are supported, according to at least some embodiments. In FIG. 10a, a creation interface (e.g., an API similar to "createDataSource" or "createModel") is used as an example of an idempotent programmatic interface. Although idempotency may be especially useful for programmatic interfaces that involve creation of artifacts such as data sources and models, idempotent interfaces may also be supported for other types of operations (e.g., deletes or executes) in various embodiments. As shown in element 1001, a request to create a new instance of an entity type ET1 may be received from a client C1 at the MLS via a programmatic interface such as a particular API. The request may indicate an identifier ID1, selected by the client, which is to be used for the new instance. In some implementations, the client may be required to specify the instance identifier, and the identifier may be used as described below to detect duplicate requests. (Allowing the client to select the identifier may have the additional advantage that a client may be able to assign a more meaningful name to entity instances than a name assigned by the MLS.) The MLS may generate a representation IPR1 of the input parameters included in the client's invocation of the programmatic interface (element 1004). For example, the set of input parameters may be supplied as input to a selected hash function, and the output of the hash function may be saved as IPR1.

In the embodiment depicted in FIG. 10a, for at least some of the artifacts generated, the MLS repository may store the corresponding instance identifier, input parameter representation, and client identifier (i.e., the identifier of the client that requested the creation of the artifact). The MLS may check, e.g., via a lookup in the artifact repository, whether an instance of entity type ET1, with instance identifier ID1 and client identifier C1 already exists in the repository. If no such instance is found (as detected in element 1007), a new instance of type ET1 with the identifier ID1, input parameter representation IPR1 and client identifier C1 may be inserted into the repository (element 1007). In addition, depending on the type of the instance, a job object may be added to a job queue to perform additional operations corresponding to the client request, such as reading/ingesting a data set, generating a set of statistics, performing feature processing, executing a model, etc. A success response to the client's request (element 1016) may be generated in the depicted embodiment. (It is noted that the success response may be implicit in some implementations—e.g., the absence of an error message may serve as an implicit indicator of success.)

If, in operations corresponding to element 1007, a pre-existing instance with the same instance identifier ID1 and client identifier C1 is found in the repository, the MLS may check whether the input parameter representation of the pre-existing instance also matches IPR1 (element 1013). If the input parameter representations also match, the MLS may assume that the client's request is a (harmless) duplicate, and no new work needs to be performed. Accordingly, the MLS may also indicate success to the client (either explicitly or implicitly) if such a duplicate request is found (element 1016). Thus, if the client had inadvertently resubmitted the same request, the creation of a new job object and the associated resource usage may be avoided. In some implementations, if the client request is found to be an exact duplicate of an earlier request using the methodology described, an indication may be provided to the client that the request, while not being designated as an error, was in fact identified as a duplicate. If the input parameter representation of the pre-existing instance does not match that of the client's request, an error message may be returned to the client (element 1019), e.g., indicating that there is a pre-existing instance of the same entity type ET1 with the same identifier. In some implementations, instead of requiring the client to submit an identifier, a different approach to duplicate detection may be used, such as the use of a persistent log of client requests, or the use of a signature representing the (request, client) combination.

Best Practices

Figure 10B:
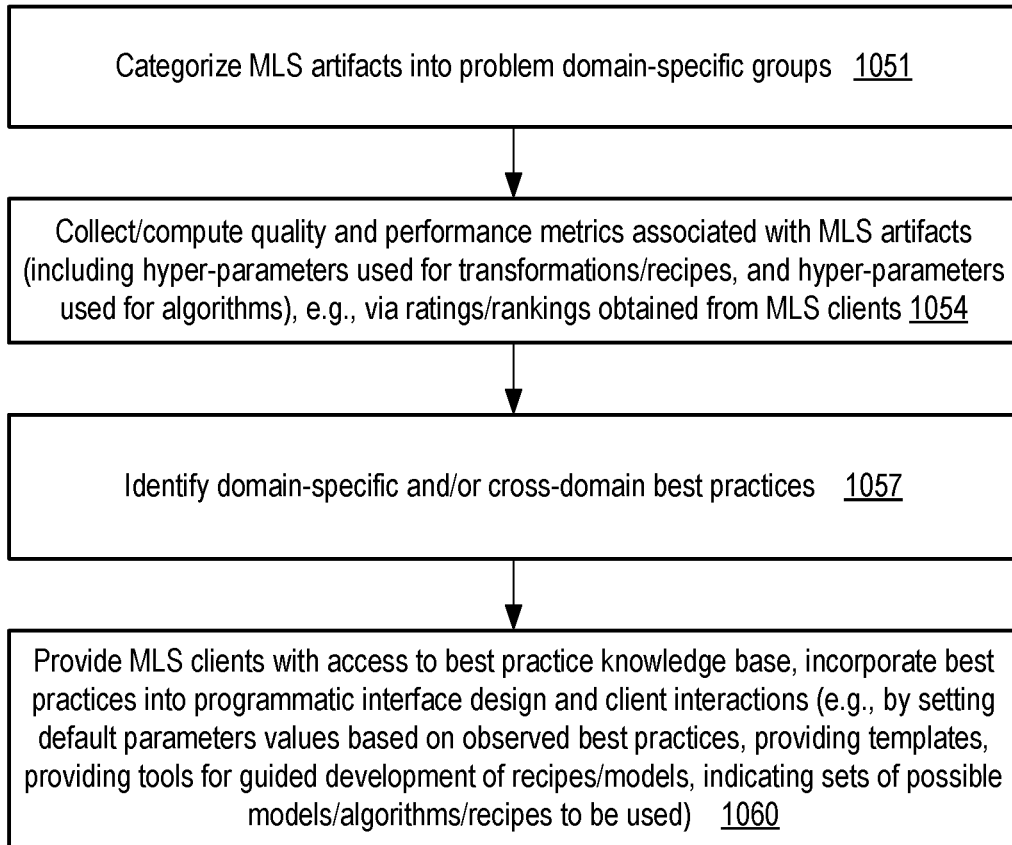
FIG. 10b is a flow diagram illustrating aspects of operations that may be performed at a machine learning service to collect and disseminate information about best practices related to different problem domains, according to at least some embodiments.

One of the advantages of building a machine learning service that may be used by large numbers of customers for a variety of use cases is that it may become possible over time to identify best practices, e.g., with respect to which techniques work best for data cleansing, sampling or sub-set extraction, feature processing, predicting, and so on. FIG. 10b is a flow diagram illustrating aspects of operations that may be performed at a machine learning service to collect and disseminate information about best practices related to different problem domains, according to at least some embodiments. As shown in element 1051, at least some of the artifacts (such as recipes and models) generated at the MLS as a result of client requests may be classified into groups based on problem domains—e.g., some artifacts may be used for financial analysis, others for computer vision applications, others for bioinformatics, and so on. Such classification may be performed based on various factors in different embodiments—e.g. based on the types of algorithms used, the names of input and output variables, customer-provided information, the identities of the customers, and so on.

In some embodiments, the MLS control plane may comprise a set of monitoring agents that collect performance and other metrics from the resources used for the various phases of machine learning operations (element 1054). For example, the amount of processing time it takes to build N trees of a random forest using a server with a CPU rating of C1 and a memory size of M1 may be collected as a metric, or the amount of time it takes to compute a set of statistics as a function of the number of data attributes examined from a data source at a database service may be collected as a metric. The MLS may also collect ratings/rankings or other types of feedback from MLS clients regarding the effectiveness or quality of various approaches or models for the different problem domains. In some embodiments, quantitative measures of model predictive effectiveness such as the area under receiver operating characteristic (ROC) curves for various classifiers may also be collected. In one embodiment, some of the information regarding quality may be deduced or observed implicitly by the MLS instead of being obtained via explicit client feedback, e.g., by keeping track of the set of parameters that are changed during training iterations before a model is finally used for a test data set. In some embodiments, clients may be able to decide whether their interactions with the MLS can be used for best practice knowledge base enhancement or not—e.g., some clients may not wish their customized techniques to become widely used by others, and may therefore opt out of sharing metrics associated with such techniques with the MLS or with other users.

Based on the collected metrics and/or feedback, respective sets of best practices for various phases of machine learning workflows may be identified (element 1057). Some of the best practices may be specific to particular problem domains, while others may be more generally applicable, and may therefore be used across problem domains. Representations or summaries of the best practices identified may be stored in a knowledge base of the MLS. Access (e.g., via a browser or a search tool) to the knowledge base may be provided to MLS users (element 1060). The MLS may also incorporate the best practices into the programmatic interfaces exposed to users—e.g., by introducing new APIs that are more likely to lead users to utilize best practices, by selecting default parameters based on best practices, by changing the order in which parameter choices in a drop-down menu are presented so that the choices associated with best practices become more likely to be selected, and so on. In some embodiments the MLS may provide a variety of tools and/or templates that can help clients to achieve their machine learning goals. For example, a web-based rich text editor or installable integrated development environment (IDE) may be provided by the MLS, which provides templates and development guidance such as automated syntax error correction for recipes, models and the like. In at least one embodiment, the MLS may provide users with candidate models or examples that have proved useful in the past (e.g., for other clients solving similar problems). The MLS may also maintain a history of the operations performed by a client (or by a set of users associated with the same customer account) across multiple interaction sessions in some implementations, enabling a client to easily experiment with or employ artifacts that the same client generated earlier.

Feature Processing Recipes

Figure 11:
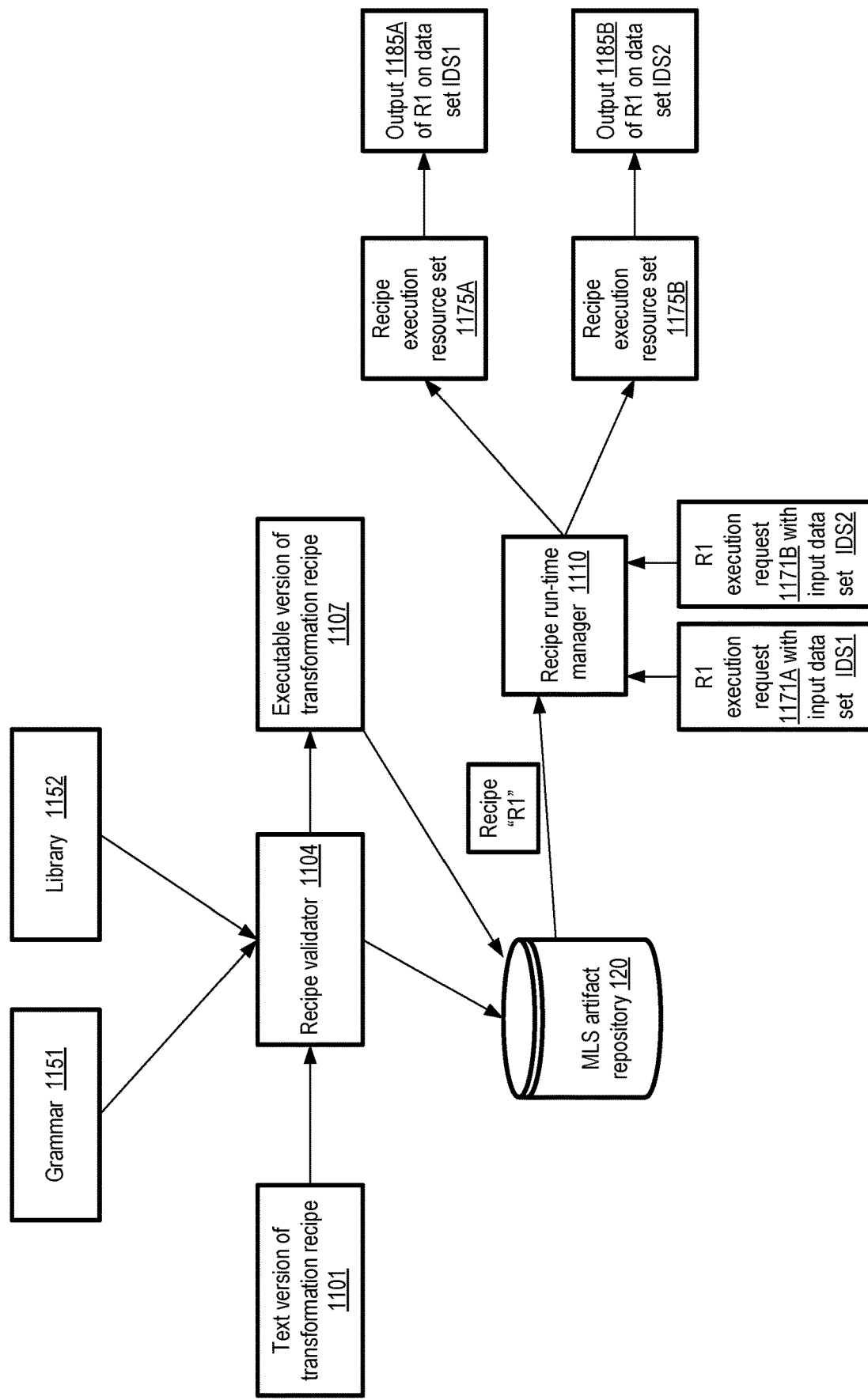
FIG. 11 illustrates examples interactions associated with the use of recipes for data transformations at a machine learning service, according to at least some embodiments.

FIG. 11 illustrates examples interactions associated with the use of recipes for data transformations at a machine learning service, according to at least some embodiments. In the depicted embodiment, a recipe language defined by the MLS enables users to easily and concisely specify transformations to be performed on specified sets of data records to prepare the records for use for model training and prediction. The recipe language may enable users to create customized groups of variables to which one or more transformations are to be applied, define intermediate variables and dependencies upon other artifacts, and so on, as described below in further detail. In one example usage flow, raw data records may first be extracted from a data source (e.g., by input record handlers such as those shown in FIG. 1 with the help of an MLS I/O library), processed in accordance with one or more recipes, and then used as input for training or prediction. In another usage flow, the recipe may itself incorporate the training and/or prediction steps (e.g., a destination model or models may be specified within the recipe). Recipes may be applied either to data records that have already split into training and test subsets, or to the entire data set prior to splitting into training and test subsets. A given recipe may be re-used on several different data sets, potentially for a variety of different machine learning problem domains, in at least some embodiments. The recipe management components of the MLS may enable the generation of easy-to-understand compound models (in which the output of one model may be used as the input for another, or in which iterative predictions can be performed) as well as the sharing and re-use of best practices for data transformations. In at least one embodiment, a pipeline of successive transformations to be performed starting with a given input data set may be indicated within a single recipe. In one embodiment, the MLS may perform parameter optimization for one or more recipes—e.g., the MLS may automatically vary such transformation properties as the sizes of quantile bins or the number of root words to be included in an n-gram in an attempt to identify a more useful set of independent variables to be used for a particular machine learning algorithm.

Figure 12:
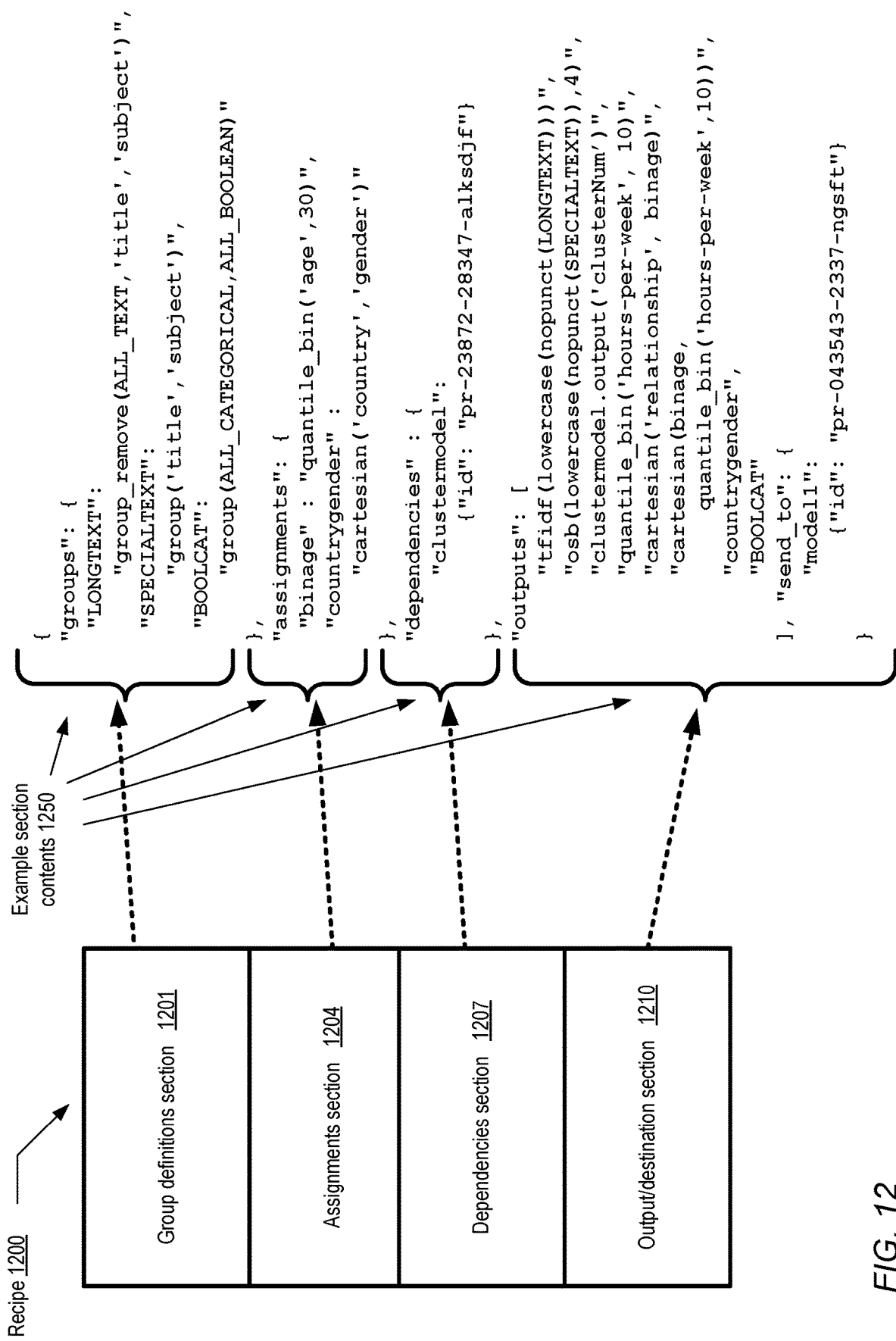
FIG. 12 illustrates example sections of a recipe, according to at least some embodiments.

In some embodiments, a text version 1101 of a transformation recipe may be passed as a parameter in a "createRecipe" MLS API call by a client. As shown, a recipe validator 1104 may check the text version 1101 of the recipe for lexical correctness, e.g., to ensure that it complies with a grammar 1151 defined by the MLS in the depicted embodiment, and that the recipe comprises one or more sections arranged in a predefined order (an example of the expected structure of a recipe is illustrated in FIG. 12 and described below). In at least some embodiments, the version of the recipe received by the MLS need not necessarily be a text version; instead, for example, a pre-processed or partially-combined version (which may in some cases be in a binary format rather than in plain text) may be provided by the client. In one embodiment, the MLS may provide a tool that can be used to prepare recipes—e.g., in the form of a web-based recipe editing tool or a downloadable integrated development environment (IDE). Such a recipe preparation tool may, for example, provide syntax and/or parameter selection guidance, correct syntax errors automatically, and/or perform at least some level of pre-processing on the recipe text on the client side before the recipe (either in text form or binary form) is sent to the MLS service. The recipe may use a number of different transformation functions or methods defined in one or more libraries 1152, such as functions to form Cartesian products of variables, n-grams (for text data), quantile bins (for numeric data variables), and the like. The libraries used for recipe validation may include third-party or client-provided functions or libraries in at least some embodiments, representing custom feature processing extensions that have been incorporated into the MLS to enhance the service's core or natively-supported feature processing capabilities. The recipe validator 1104 may also be responsible for verifying that the functions invoked in the text version 1101 are (a) among the supported functions of the library 1152 and (b) used with the appropriate signatures (e.g., that the input parameters of the functions match the types and sequences of the parameters specified in the library). In some embodiments, MLS customers may register additional functions as part of the library, e.g., so that custom "user-defined functions" (UDFs) can also be included in the recipes. Customers that wish to utilize UDFs may be required to provide an indication of a module that can be used to implement the UDFs (e.g., in the form of source code, executable code, or a reference to a third-party entity from which the source or executable versions of the module can be obtained by the MLS) in some embodiments. A number of different programming languages and/or execution environments may be supported for UDFs in some implementations, e.g., including Java™, Python, and the like. The text version of the recipe may be converted into an executable version 1107 in the depicted embodiment. The recipe validator 1104 may be considered analogous to a compiler for the recipe language, with the text version of the recipe analogous to source code and the executable version analogous to the compiled binary or byte code derived from the source code. The executable version may also be referred to as a feature processing plan in some embodiments. In the depicted embodiment, both the text version 1101 and the executable version 1107 of a recipe may be stored within the MLS artifact repository 120.

A run-time recipe manager 1110 of the MLS may be responsible for the scheduling of recipe executions in some embodiments, e.g., in response to the equivalent of an "executeRecipe" API specifying an input data set. In the depicted embodiment, two execution requests 1171A and 1171B for the same recipe R1 are shown, with respective input data sets IDS1 and IDS2. The input data sets may comprise data records whose variables may include instances of any of a variety of data types, such as, for example text, a numeric data type (e.g., real or integer), Boolean, a binary data type, a categorical data type, an image processing data type, an audio processing data type, a bioinformatics data type, a structured data type such as a particular data type compliant with the Unstructured Information Management Architecture (UIMA), and so on. In each case, the run-time recipe manager 1110 may retrieve (or generate) the executable version of R1, perform a set of run-time validations (e.g., to ensure that the requester is permitted to execute the recipe, that the input data appears to be in the correct or expected format, and so on), and eventually schedule the execution of the transformation operations of R1 at respective resource sets 1175A and 1175B. In at least some cases, the specific libraries or functions to be used for the transformation may be selected based on the data types of the input records—e.g., instances of a particular structured data type may have to be handled using functions or methods of a corresponding library defined for that data type. Respective outputs 1185A and 1185B may be produced by the application of the recipe R1 on IDS1 and IDS2 in the depicted embodiment. Depending on the details of the recipe R1, the outputs 1185A may represent either data that is to be used as input for a model, or a result of a model (such as a prediction or evaluation). In at least some embodiments, a recipe may be applied asynchronously with respect to the execution request—e.g., as described earlier, a job object may be inserted into a job queue in response to the execution request, and the execution may be scheduled later. The execution of a recipe may be dependent on other jobs in some cases—e.g., upon the completion of jobs associated with input record handling (decryption, decompression, splitting of the data set into training and test sets, etc.). In some embodiments, the validation and/or compilation of a text recipe may also or instead be managed using asynchronously-scheduled jobs.

In some embodiments, a client request that specifies a recipe in text format and also includes a request to execute the recipe on a specified data set may be received—that is, the static analysis steps and the execution steps shown in FIG. 11 may not necessarily require separate client requests. In at least some embodiments, a client may simply indicate an existing recipe to be executed on a data set, selected for example from a recipe collection exposed programmatically by the MLS, and may not even have to generate a text version of a recipe. In one embodiment, the recipe management components of the MLS may examine the set of input data variables, and/or the outputs of the transformations indicated in a recipe, automatically identify groups of variables or outputs that may have a higher predictive capability than others, and provide an indication of such groups to the client.

FIG. 12 illustrates example sections of a recipe, according to at least some embodiments. In the depicted embodiment, the text of a recipe 1200 may comprise four separate sections—a group definitions section 1201, an assignments section 1204, a dependencies section 1207, and an output/destination section 1210. In some implementations, only the output/destination section may be mandatory; in other implementations, other combinations of the sections may also or instead be mandatory. In at least one embodiment, if more than one of the four section types shown in FIG. 12 is included in a recipe, the sections may have to be arranged in a specified order. In at least one embodiment, a destination model (i.e., a machine learning model to which the output of the recipe transformations is to be provided) may be indicated in a separate section than the output section.

In the group definitions section 1201, as implied by the name, clients may define groups of input data variables, e.g., to make it easier to indicate further on in the recipe that the same transformation operation is to be applied to all the member variables of a group. In at least some embodiments, the recipe language may define a set of baseline groups, such as ALL_INPUT (comprising all the variables in the input data set), ALL_TEXT (all the text variables in the data set), ALL_NUMERIC (all integer and real valued variables in the data set), ALL_CATEGORICAL (all the categorical variables in the data set) and ALL_BOOLEAN (all the Boolean variables in the data set, e.g., variables that can only have the values "true" or "false" (which may be represented as "1" and "0" respectively in some implementations)). In some embodiments, the recipe language may allow users to change or "cast" the types of some variables when defining groups—e.g., variables that appear to comprise arbitrary text but are only expected to have only a discrete set of values, such as the names of the months of the year, the days of the week, or the states of a country, may be converted to categorical variables instead of being treated as generic text variables. Within the group definitions section, the methods/functions "group" and "group_remove" (or other similar functions representing set operations) may be used to combine or exclude variables when defining new groups. A given group definition may refer to another group definition in at least some embodiments. In the example section contents 1250 shown in FIG. 12, three groups are defined: LONGTEXT, SPECIAL_TEXT and BOOLCAT. LONGTEXT comprises all the text variables in the input data, except for variables called "title" and "subject". SPECIAL_TEXT includes the text variables "subject" and "title". BOOLCAT includes all the Boolean and categorical variables in the input data. It is noted that at least in some embodiments, the example group definitions shown may be applied to any data set, even if the data set does not contain a "subject" variable, a "title" variable, any Boolean variables, any categorical variables, or even any text variables. If there are no text variables in an input data set, for example, both LONGTEXT and SPECIAL_TEXT would be empty groups with no members with respect to that particular input data set in such an embodiment.

Intermediate variables that may be referenced in other sections of the recipe 1200 may be defined in the assignments section 1204. In the example assignments section, a variable called "binage" is defined in terms of a "quantile_bin" function (which is assumed to be included among the pre-defined library functions of the recipe language in the depicted embodiment) applied to an "age" variable in the input data, with a bin count of "30". A variable called "countrygender" is defined as a Cartesian product of two other variables "country" and "gender" of the input data set, with the "cartesian" function assumed to be part of the pre-defined library. In the dependencies section 1207, a user may indicate other artifacts (such as the model referenced as "clustermodel" in the illustrated example, with the MLS artifact identifier "pr-23872-28347-alksdjf") upon which the recipe depends. For example, in some cases, the output of a model that is referenced in the dependencies section of the recipe may be ingested as the input of the recipe, or a portion of the output of the referenced model may be included in the output of the recipe. The dependencies section may, for example, be used by the MLS job scheduler when scheduling recipe-based jobs in the depicted embodiment. Dependencies on any of a variety of artifacts may be indicated in a given recipe in different embodiments, including other recipes, aliases, statistics sets, and so on.

In the example output section 1210, a number of transformations are applied to input data variables, groups of variables, intermediate variables defined in earlier sections of the recipe, or the output of an artifact identified in the dependencies section. The transformed data is provided as input to a different model identified as "model 1". A term-frequency-inverse document frequency (tfidf) statistic is obtained for the variables included in the LONGTEXT group, after punctuation is removed (via the "nopunct" function) and the text of the variables is converted to lowercase (by the "lowercase" function). The tfidf measure may be intended to reflect the relative importance of words within a document in a collection or corpus; the tfidf value for a given word typically is proportional to the number of occurrences of the word in a document, offset by the frequency of the word in the collection as a whole. The tfidf, nopunct and lowercase functions are all assumed to be defined in the recipe language's library. Similarly, other transformations indicated in the output section use the osb (orthogonal sparse bigrams) library function, the quantile_bin library function for binning or grouping numeric values, and the Cartesian product function. Some of the outputs indicated in section 1210 may not necessarily involve transformations per se: e.g., the BOOLCAT group's variables in the input data set may simply be included in the output, and the "clusterNum" output variable of "clustermodel" may be included without any change in the output of the recipe as well.

In at least some embodiments, the entries listed in the output section may be used to implicitly discard those input data variables that are not listed. Thus, for example, if the input data set includes a "taxable-income" numeric variable, it may simply be discarded in the illustrated example since it is not directly or indirectly referred to in the output section. The recipe syntax and section-by-section organization shown in FIG. 12 may differ from those of other embodiments. A wide variety of functions and transformation types (at least some of which may differ from the specific examples shown in FIG. 12) may be supported in different embodiments. For example, date/time related functions "dayofweek", "hourofday" "month", etc. may be supported in the recipe language in some embodiments. Mathematical functions such as "sqrt" (square root), "log" (logarithm) and the like may be supported in at least one embodiment. Functions to normalize numeric values (e.g., map values from a range {−N1 to +N2} into a range {0 to 1}), or to fill in missing values (e.g., "replace_missing_with_mean (ALL_NUMERIC)") may be supported in some embodiments. Multiple references within a single expression to one or more previously-defined group variables, intermediate variables, or dependencies may be allowed in one embodiment: e.g., the recipe fragment "replace_missing(ALL_NUMERIC, mean(ALL_NUMERIC))" may be considered valid. Mathematical expressions involving combinations of variables such as "'income'+10*'capital_gains'" may also be permitted within recipes in at least some embodiments. Comments may be indicated by delimiters such as "//" in some recipes.

Recipe Validation

FIG. 13 illustrates an example grammar that may be used to define acceptable recipe syntax, according to at least some embodiments. The grammar shown may be formatted in accordance with the requirements of a parser generator such as a version of ANTLR (ANother Tool for Language Recognition). As shown, the grammar 1320 defines rules for the syntax of expressions used within a recipe. Given a grammar similar to that shown in FIG. 13, a tools such as ANTLR may generate a parser than can build an abstract syntax tree from a text version of a recipe, and the abstract syntax tree may then be converted into a processing plan by the MLS control plane. An example tree generated using the grammar 1320 is shown in FIG. 14.

In the example grammar "MLS-Recipe" shown in FIG. 13, an expression "expr" can be one of a "BAREID", a "QUOTEDID", a "NUMBER" or a "functioncall", with each of the latter four entities defined further down in the grammar. A BAREID starts with an upper case or lower case letter and can include numerals. A QUOTEDID can comprise any text within single quotes. NUMBERS comprise real numeric values with or without exponents, as well as integers. A functioncall must include a function name (a BAREID) followed by zero or more parameters within round brackets. Whitespace and comments are ignored when generating an abstract syntax tree in accordance with the grammar 1320, as indicated by the lines ending in "→skip".

Figure 14:
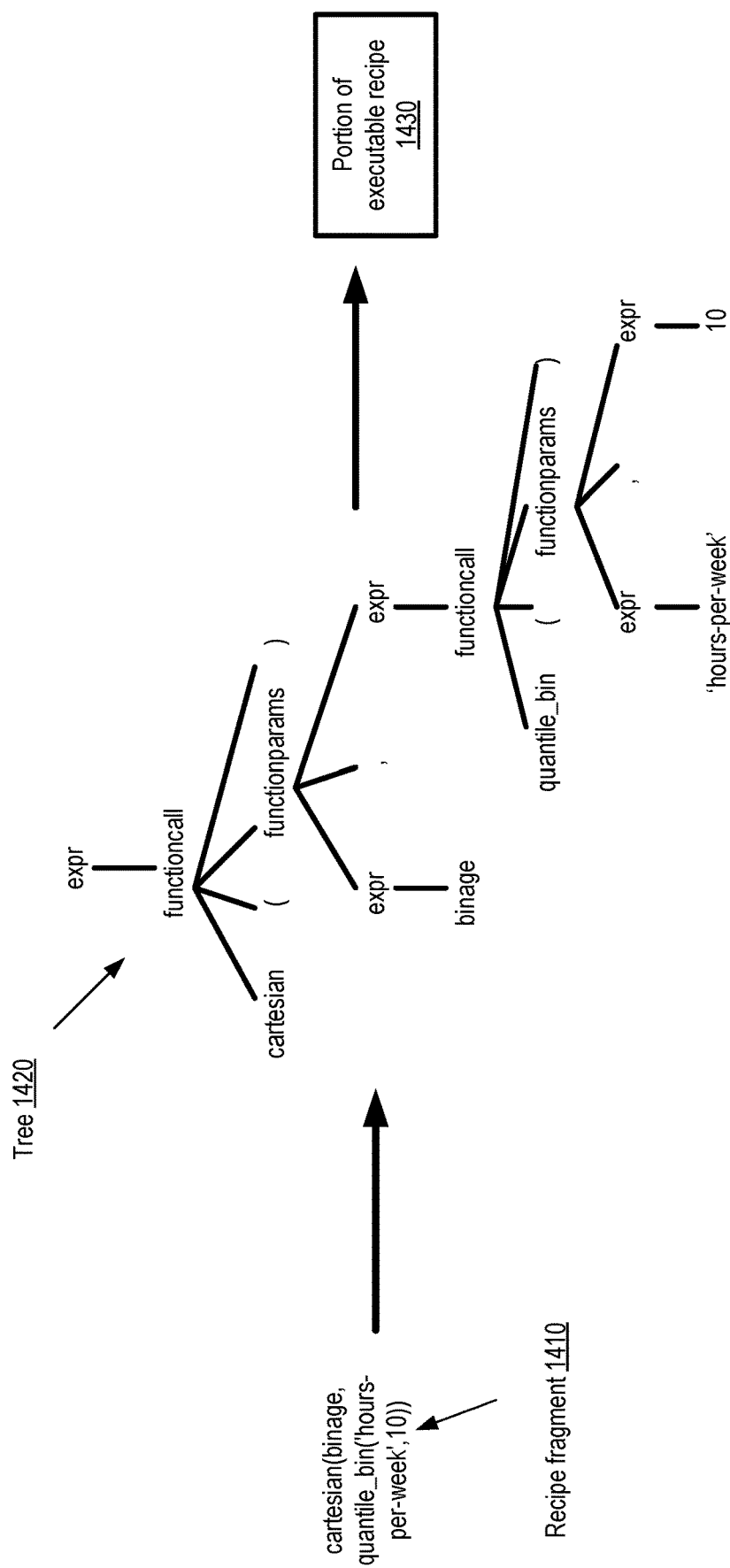
FIG. 14 illustrates an example of an abstract syntax tree that may be generated for a portion of a recipe, according to at least some embodiments.

FIG. 14 illustrates an example of an abstract syntax tree that may be generated for a portion of a recipe, according to at least some embodiments. The example recipe fragment 1410 comprising the text "cartesian(binage, quantile_bin ('hours-per-week', 10))" may be translated into abstract syntax tree 1420 in accordance with grammar 1320 (or some other similar grammar) in the depicted embodiment. As shown, "cartesian" and "quantile_bin" are recognized as function calls, each with two parameters. During the syntax analysis of the illustrated recipe fragment, recipe validator 1104 may ensure that the number and order of the parameters passed to "cartesian" and "quantile_bin" match the definitions of those functions, and that the variables "binage" and "hours_per_week" are defined within the recipe. If any of these conditions are not met, an error message indicating the line number within the recipe at which the "cartesian" fragment is located may be provided to the client that submitted the recipe. Assuming that no validation errors are found in the recipe as a whole, an executable version of the recipe may be generated, of which a portion 1430 may represent the fragment 1410.

Domain-Specific Recipe Collections

Figure 15:
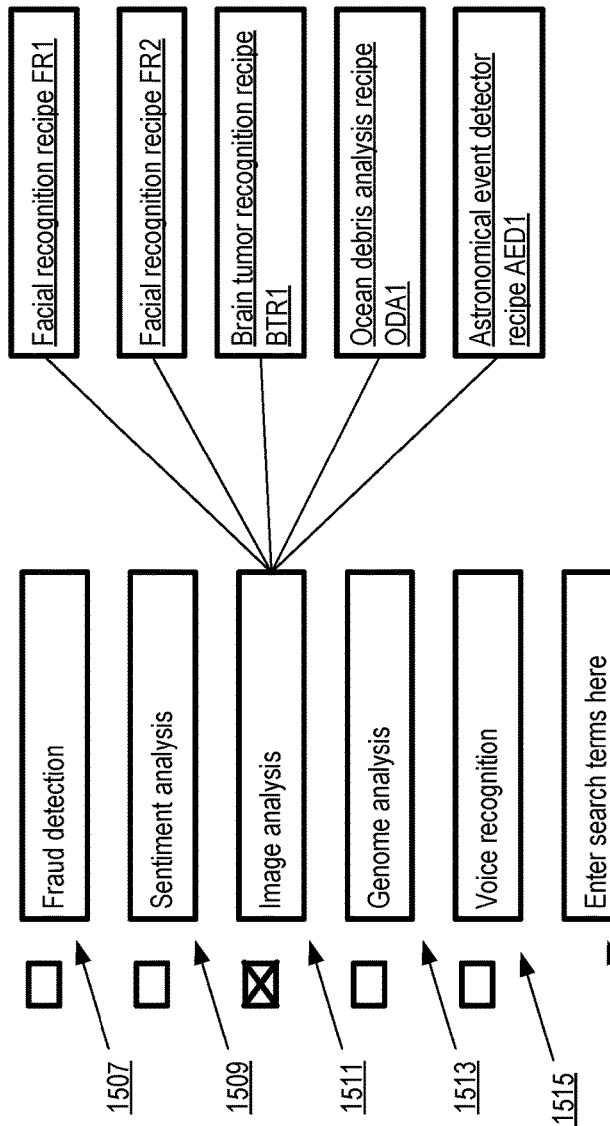
FIG. 15 illustrates an example of a programmatic interface that may be used to search for domain-specific recipes available from a machine learning service, according to at least some embodiments.

In at least some embodiments, some users of the MLS may not be experts at feature processing, at least during a period when they start using the MLS. Accordingly, the MLS may provide users with access to a collection of recipes that have previously been found to be useful in various problem domains. FIG. 15 illustrates an example of a programmatic interface that may be used to search for domain-specific recipes available from a machine learning service, according to at least some embodiments. As shown, a web page 1501 may be implemented for a recipe search, which includes a message area 1504 providing high-level guidance to MLS users, and a number of problem domains for which recipes are available. In the depicted example, a MLS customer can use a check-box to select from among the problem domains fraud detection 1507, sentiment analysis 1509, image analysis 1511, genome analysis 1513, or voice recognition 1515. A user may also search for recipes associated with other problem domains using search term text block 1517 in the depicted web page.

For the selected problem domain (image analysis), links to five example recipes are shown on web page 1501: recipes FR1 and FR2 for facial recognition, BTR1 for brain tumor recognition, ODA1 for ocean debris recognition, and AED1 for astronomical event detection. Additional details regarding a given recipe may be obtained by the user by clicking on the recipe's name: for example, in some embodiments, a description of what the recipe does may be provided, ratings/rankings of the recipe submitted by other users may be provided, comments submitted by other users on the recipes, and so on. If a user finds a recipe that they wish to use (either unchanged or after modifying the recipe), they may be able to download the text version of the recipe, e.g., for inclusion in a subsequent MLS API invocation. As indicated in the message area 1504, users may also be able to submit their own recipes for inclusion in the collection exposed by the MLS in the depicted embodiment. In at least some implementations, the MLS may perform some set of validation steps on a submitted recipe (e.g., by checking that the recipe produces meaningful output for various input data sets) before allowing other users access.

Automated Parameter Tuning for Recipe Transformations

Figure 16:
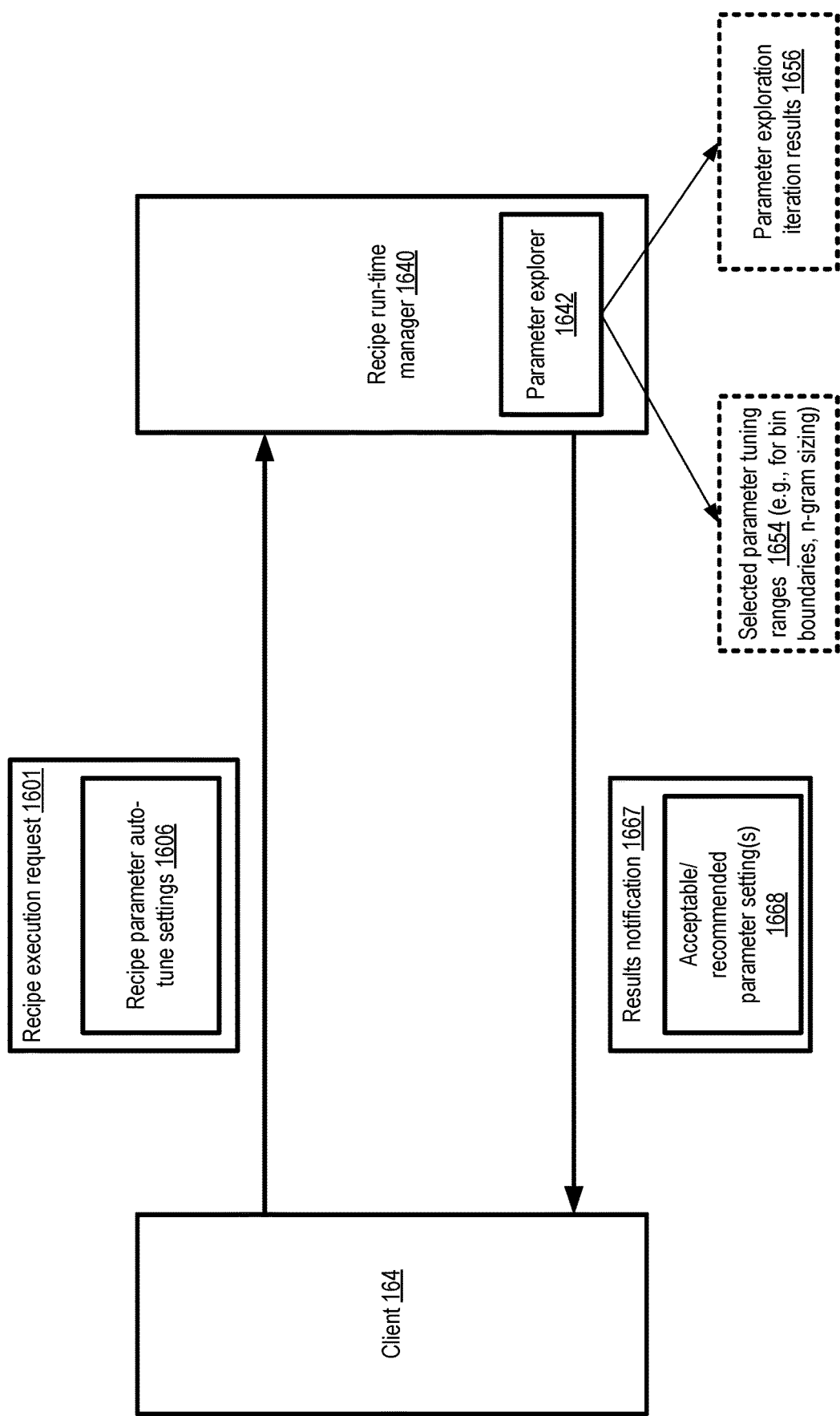
FIG. 16 illustrates an example of a machine learning service that automatically explores a range of parameter settings for recipe transformations on behalf of a client, and selects acceptable or recommended parameter settings based on results of such explorations, according to at least some embodiments.

For many types of feature processing transformation operations, such as creating quantile bins for numeric data attributes, generating ngrams, or removing sparse or infrequent words from documents being analyzed, parameters may typically have to be selected, such as the sizes/boundaries of the bins, the lengths of the ngrams, the removal criteria for sparse words, and so on. The values of such parameters (which may also be referred to as hyper-parameters in some environments) may have a significant impact on the predictions that are made using the recipe outputs. Instead of requiring MLS users to manually submit requests for each parameter setting or each combination of parameter settings, in some embodiments the MLS may support automated parameter exploration. FIG. 16 illustrates an example of a machine learning service that automatically explores a range of parameter settings for recipe transformations on behalf of a client, and selects acceptable or recommended parameter settings based on results of such explorations, according to at least some embodiments.

In the depicted embodiment, an MLS client 164 may submit a recipe execution request 1601 that includes parameter auto-tune settings 1606. For example, the client 164 may indicate that the bin sizes/boundaries for quantile binning of one or more variables in the input data should be chosen by the service, or that the number of words in an n-gram should be chosen by the service. Parameter exploration and/or auto-tuning may be requested for various clustering-related parameters in some embodiments, such as the number of clusters into which a given data set should be classified, the cluster boundary thresholds (e.g., how far apart two geographical locations can be to be considered part of a set of "nearby" locations), and so on. Various types of image processing parameter settings may be candidates for automated tuning in some embodiments, such as the extent to which a given image should be cropped, rotated, or scaled during feature processing. Automated parameter exploration may also be used for selection dimensionality values for a vector representation of a text document (e.g., in accordance with the Latent Dirichlet Allocation (LDA) technique) or other natural language processing techniques. In some cases, the client may also indicate the criteria to be used to terminate exploration of the parameter value space, e.g., to arrive at acceptable parameter values. In at least some embodiments, the client may be given the option of letting the MLS decide the acceptance criteria to be used—such an option may be particularly useful for non-expert users. In one implementation, the client may indicate limits on resources or execution time for parameter exploration. In at least one implementation, the default setting for an auto-tune setting for at least some output transformations may be "true", e.g., a client may have to explicitly indicate that auto-tuning is not to be performed in order to prevent the MLS from exploring the parameter space for the transformations.

In response to a determination that auto-tuning is to be performed for a given transformation operation, the MLS (e.g., a parameter explorer 1642 of the recipe run-time manager 1640) may select a parameter tuning range 1654 for the transformation (e.g., whether the quantile bin counts of 10, 20, 30 and 40 should be explored for a particular numeric variable). The parameter ranges may be selected based on a variety of factors in different embodiments, including best practices known to the MLS for similar transformations, resource constraints, the size of the input data set, and so on. In scenarios in which respective parameters for combinations of several transformation operations are to be tuned (e.g., if quantile binning is being auto-tuned for more than one variable), the parameter explorer 1642 may select a respective set of values for each parameter so as to keep the number of combinations that are to be tried below a threshold. Having determined the range of parameter values, the parameter explorer may execute iterations of transformations for each parameter value or combination, storing the iteration results 1656 in at least some implementations in temporary storage. Based on the result sets generated for the different parameter values and the optimization criteria being used, at least one parameter value may be identified as acceptable for each parameter. In the depicted embodiment, a results notification 1667 may be provided to the client, indicating the accepted or recommended parameter value or values 1668 for the different parameters being auto-tuned. For some parameters, it may not always be straightforward to identify a particular parameter value as being the single best value, e.g., because several different values may lead to similar results. In some embodiments, instead of identifying a single optimal value for such a parameter, the MLS may instead identify a set of candidate values {V1, V2, V3, . . . , Vn} for a given parameter P, such that all the values of the set provide results of similar quality. The set of candidate values may be provided to the client, enabling the client to choose the specific parameter value to be used, and the client may notify the MLS regarding the selected parameter value. In one embodiment, the client may only be provided with an indication of the results of the recipe transformations obtained using the accepted/optimized parameter values, without necessarily being informed about the parameter value settings used.

Methods of Supporting Feature Processing Via Re-Usable Recipes

Figure 17:
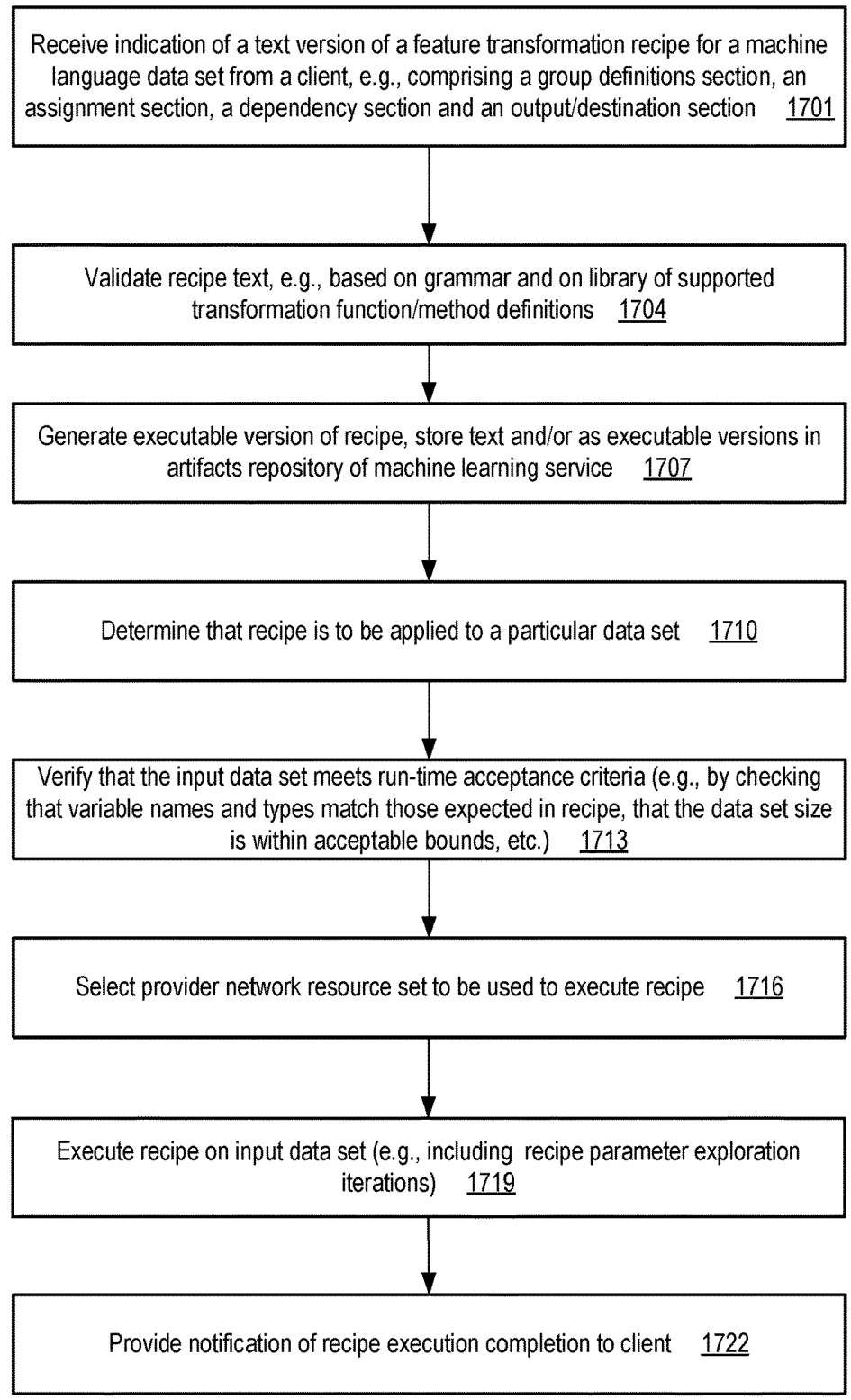
FIG. 17 is a flow diagram illustrating aspects of operations that may be performed at a machine learning service that supports re-usable recipes for data set transformations, according to at least some embodiments.

FIG. 17 is a flow diagram illustrating aspects of operations that may be performed at a machine learning service that supports re-usable recipes for data set transformations, according to at least some embodiments. As shown in element 1701, an indication of a text version of a recipe for transformation operations to be performed on input data sets may be received at a network-accessible MLS implemented at a provider network. In one embodiment, the recipe text may include one or more of four sections in accordance with a recipe language defined by the MLS: a group definitions section, an assignment section, a dependency section, and an output/destination section (which may also be referred to simply as the output section). In some embodiments, one or more sections (such as the output section) may be mandatory. In general, the output/destination section may indicate various feature processing transformation operations that are to be performed on entities defined in other sections of the recipe, or directly on input variables of a data set. The group definitions section may be used to define custom groups of input variables (or input data variables combined with other groups, or groups derived from other groups). Such group definitions may make it easier to specify in the output section that a common transformation is to be applied to several variables. A number of built-in or predefined groups may be supported by the recipe language in some embodiments, such as ALL_NUMERIC or ALL_CATEGORICAL, along with functions such as "group_remove" and "group" to allow recipe creators to easily indicate variable exclusions and combinations to be used when defining new groups. The assignment section may be used to define one or more intermediate variables that can be used elsewhere in the recipe. The dependency section may indicate that the recipe depends on another machine learning artifact (such as a model, or another recipe) or on multiple other artifacts stored in an MLS's repository. In some embodiments, the output section may indicate not just the specific transformations to be applied to specified input variables, defined groups, intermediate variables or output of the artifacts indicated in the dependency section, but also the destination models to which the transformation results are to be provided as input.

The machine learning service may natively support libraries comprising a variety of different transformation operations that can be used in the recipe's output section, such as the types of functions illustrated in FIG. 12. In some embodiments, several different libraries, each corresponding to a given problem domain or to a respective class of machine learning algorithm, may be supported by the MLS. In addition, in one embodiment MLS customers may be able to register their own custom functions (called "user-defined functions" or UDFs), third-party functions, or libraries comprising multiple UDFs or third-party functions with the MLS to extend the core feature processing capabilities of the MLS. UDFs may be provided to the MLS by clients in a variety of different formats (e.g., including one or more text formats and/or one or more binary formats) in some embodiments. A number of different programming or scripting languages may be supported for UDFs in such embodiments. An API for registering externally-produced transformation functions or libraries with the MLS may be supported in some embodiments, e.g., enabling a client to indicate whether the newly-registered functions are to be made accessible to other clients or restricted for use by the submitting client. In one implementation, a recipe may comprise an import section in which one or more libraries (e.g., libraries other than a core or standard library of the MLS) whose functions are used in the recipe may be listed. In some implementations, the MLS may impose resource usage restrictions on at least some UDFs—e.g., to prevent runaway consumption of CPU time, memory, disk space and the like, a maximum limit may be set on the time that a given UDF can run. In this way, the negative consequences of executing potentially error-prone UDFs (e.g., a UDF whose logic comprises an infinite loop under certain conditions) may be limited. In at least some embodiments, the recipe text (or a file or URL from which the recipe text can be read) may be passed as a parameter in an API (such as a "createRecipe" API) invoked by an MLS client.

The recipe text may be validated at the MLS, e.g., in accordance with a set of syntax rules of a grammar and a set of libraries that define supported transformation methods or functions (element 1704). If syntax errors or unresolvable tokens are identified during the text validation checks, in at least some embodiments error messages that indicate the portion of the text that needs to be corrected (e.g., by indicating the line number and/or the error-inducing tokens) may be provided to the recipe submitter. If no errors are found, or after the errors found are corrected and the recipe is re-submitted, an executable version of the recipe text may be generated (element 1707). One or both versions of the recipe (the text version and the executable version) may be stored in an artifact repository of the MLS in the depicted embodiment, e.g., with a unique recipe identifier generated by the MLS being provided to the recipe submitter.

The MLS may determine, e.g., in response to a different API invocation or because the initial submission of the recipe included an execution request, that the recipe is to be applied to a particular data set (element 1710). The data set may be checked to ensure that it meets run-time acceptance criteria, e.g., that the input variable names and data types match those indicated in the recipe, and that the data set is of an acceptable size (element 1713). A set of provider network resources (e.g., one or more compute servers, configured with appropriate amounts of storage and/or network capacity as determined by the MLS) may be identified for the recipe execution (element 1716). The transformations indicated in the recipe may then be applied to the input data set (element 1719). In some embodiments, as described above with respect to FIG. 16, the MLS may perform parameter explorations in an effort to identify acceptable parameter values for one or more of the transformations. After the recipe transformations are completed (and/or the results of the transformations are provided to the appropriate destinations, such as a model specified in the recipe itself), a notification that the recipe's execution is complete may be provided to the client that requested the execution (element 1722) in the depicted embodiment.

It is noted that in various embodiments, operations other than those illustrated in the flow diagrams of FIGS. 9a, 9b, 10a and 10b may be used to implement at least some of the techniques of a machine learning service described above. Some of the operations shown may not be implemented in some embodiments, may be implemented in a different order, or in parallel rather than sequentially. For example, with respect to FIG. 9b, a check as to whether the client's resource quota has been exhausted may be performed subsequent to determining the workload strategy in some embodiments, instead of being performed before the strategy is determined.

Use Cases

The techniques described above, of providing a network-accessible, scalable machine learning service that is geared towards users with a wide range of expertise levels in machine learning tools and methodologies may be beneficial for a wide variety of applications. Almost every business organization or government entity is capable of collecting data on various aspects its operations today, and the discovery of meaningful statistical and/or causal relationships between different components of the collected data and the organization's objectives may be facilitated by such a service. Users of the MLS may not have to concern themselves with the details of provisioning the specific resources needed for various tasks of machine learning workflows, such as data cleansing, transformations of cleansed data into a format that can be fed into models, or model execution. Best practices developed over years of experience with different data cleansing approaches, transformation types, parameter settings for transformations as well as models may be incorporated into the programmatic interfaces (such as easy-to-learn and easy-to-use APIs) of the MLS, e.g., in the form of default settings that users need not even specify. Users of the MLS may submit requests for various machine learning tasks or operations, some of which may depend on the completion of other tasks, without having to manually manage the scheduling or monitor the progress of the tasks (some of which may take hours or days, depending on the nature of the task or the size of the data set involved).

A logically centralized repository of machine learning objects corresponding to numerous types of entities (such as models, data sources, or recipes) may enable multiple users or collaborators to share and re-use feature-processing recipes on a variety of data sets. Expert users or model developers may add to the core functionality of the MLS by registering third-party or custom libraries and functions. The MLS may support isolated execution of certain types of operations for which enhanced security is required. The MLS may be used for, and may incorporate techniques optimized for, a variety of problem domains covering both supervised and unsupervised learning, such as, fraud detection, financial asset price predictions, insurance analysis, weather prediction, geophysical analysis, image/video processing, audio processing, natural language processing, medicine and bioinformatics and so on.

Illustrative Computer System

Figure 18:
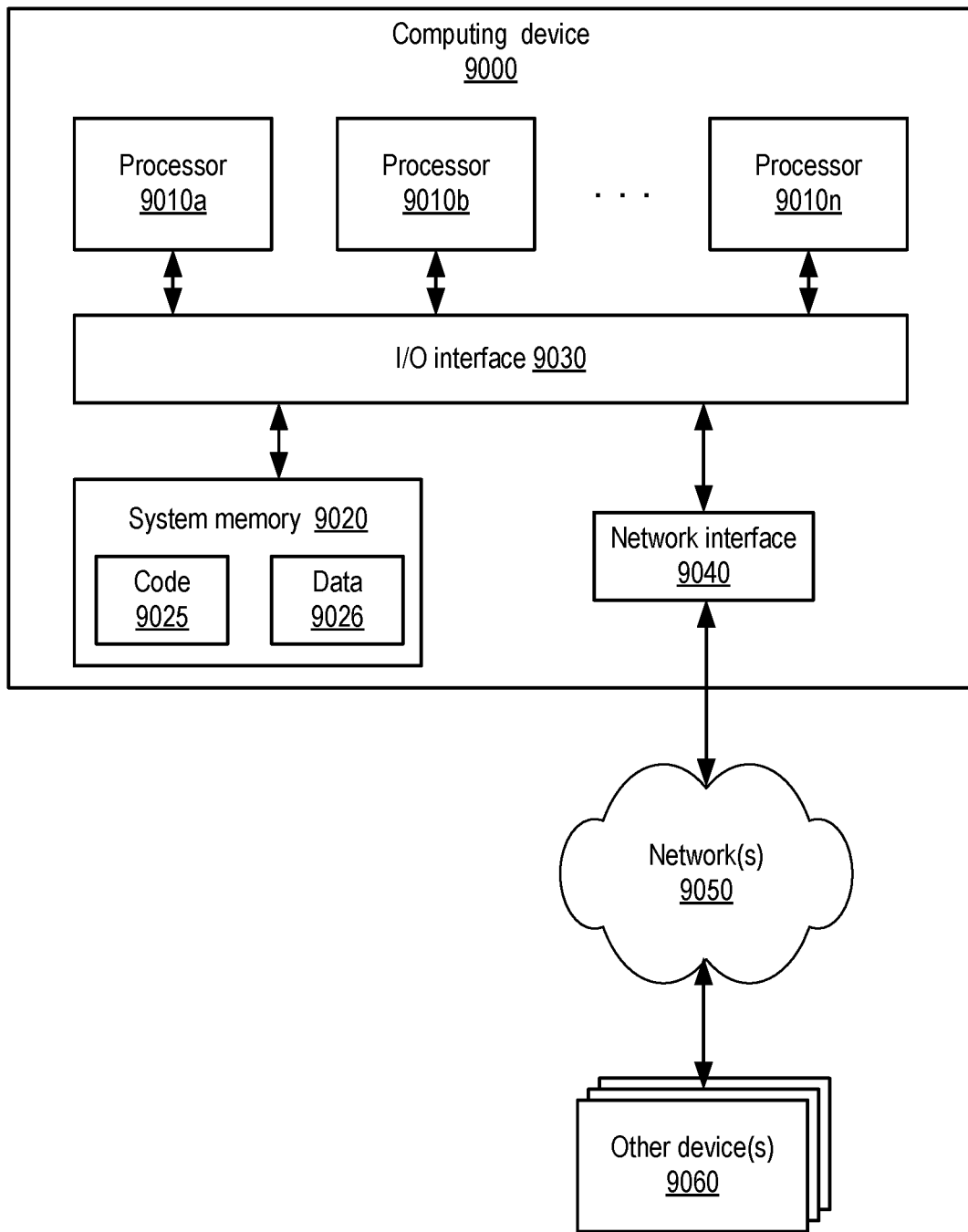
FIG. 18 is a block diagram illustrating an example computing device that may be used in at least some embodiments.

In at least some embodiments, a server that implements a one or more of the components of a machine learning service (including control-plane components such as API request handlers, input record handlers, recipe validators and recipe run-time managers, job schedulers, artifact repositories, and the like, as well as data plane components) may include a general-purpose computer system that includes or is configured to access one or more computer-accessible media. FIG. 18 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, or MIPS ISAs, or any other suitable ISA. In multiprocessor systems, each of processors 9010 may commonly, but not necessarily, implement the same ISA. In some implementations, graphics processing units (GPUs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferro-electric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, and any peripheral devices in the device, including network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 17, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may be one embodiment of a computer-accessible medium configured to store program instructions and data as described above for FIG. 1 through FIG. 18 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. Further, a computer-accessible medium may include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 18 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

Embodiments of the disclosure can be described in view of the following clauses:

1. A system, comprising:
one or more computing devices configured to:
receive, via a particular programmatic interface of a set of programmatic interfaces implemented at a network-accessible machine learning service of a provider network, a first request from a client to perform a particular operation associated with an instance of an entity type, wherein the entity type comprises one or more of: (a) a data source to be used for a machine learning model, (b) a set of statistics to be computed from a particular data source, (c) a set of feature processing transformation operations to be performed on a specified data set, (d) a machine learning model employing a selected algorithm, (e) an alias associated with a machine learning model, or (f) a result of a particular machine learning model;
insert a job object corresponding to the first request in a job queue of the machine learning service;
provide an indication to the client that the first request has been accepted for execution;
determine, in accordance with a first workload distribution strategy identified for the first request, a first set of provider network resources to be used to perform the particular operation;
receive, prior to a completion of the particular operation indicated in the first request, a second request from the client to perform a second operation dependent on a result of the particular operation;
insert a second job object corresponding to the second request in the job queue, wherein the second job object includes an indication of a dependency of the second operation on a result of the particular operation;
prior to initiating execution of the second operation, provide a second indication to the client that the second request has been accepted for execution; and
in response to a determination that the particular operation has been completed successfully, schedule the second operation on a second set of provider network resources.

2. The system as recited in clause 1, wherein the particular operation comprises one or more of: (a) a creation of the instance, (b) a read operation to obtain respective values of one or more attributes of the instance, (c) a modification of an attribute of the instance, (d) a deletion of the instance, (e) a search operation, or (f) an execute operation.

3. The system as recited in any of clauses 1-2, wherein the particular operation comprises assignment of an alias usable by a designated group of users of the machine learning service to execute a particular machine learning model, wherein the alias comprises a pointer to the particular machine learning model, wherein at least some users of the designated group of users are not permitted to modify the pointer.

4. The system as recited in any of clauses 1-3, wherein the set of programmatic interfaces comprises a representational state transfer application programming interface.

5. The system as recited in any of clauses 1-4, wherein the particular operation comprises a creation of a particular data source, wherein the one or more computing devices are further configured to:
generate a particular set of statistics on one or more variables of data records of the particular data source, without receiving a request from the client for the particular set of statistics; and
provide, to the client, an indication of the particular set of statistics.

6. A method, comprising:
performing, by one or more computing devices:
receiving, via a particular programmatic interface of a set of programmatic interfaces implemented at a machine learning service, a first request from a client to perform a particular operation associated with an instance of an entity type, wherein the entity type comprises one or more of: (a) a data source to be used for generating a machine learning model, (b) a set of feature processing transformation operations to be performed on a specified data set, (c) a machine learning model employing a selected algorithm, or (d) an alias associated with a machine learning model;
inserting a job corresponding to the first request in a job queue of the machine learning service;
receiving, prior to a completion of the particular operation indicated in the first request, a second request from the client to perform a second operation dependent on a result of the particular operation;
inserting a second job object corresponding to the second request in the job queue, wherein the second job object includes an indication of a dependency of the second operation on a result of the particular operation; and
in response to determining that the particular operation has been completed successfully, scheduling the second operation.

7. The method as recited in clause 6, wherein the particular operation comprises one or more of: (a) a creation of the instance, (b) a read operation to obtain respective values of one or more attributes of the instance, (c) a modification of an attribute of the instance, (d) a deletion of the instance, (e) a search operation, or (f) an execute operation.

8. The method as recited in any of clauses 6-7, wherein the particular operation comprises assignment of an alias usable by a designated group of users of the machine learning service to execute a particular machine learning model, wherein the alias comprises a pointer to the particular machine learning model, wherein at least some users of the designated group of users are not permitted to modify the pointer.

9. The method as recited in any of clauses 6-8, wherein the particular operation comprises a creation of a particular data source, further comprising performing, by the one or more computing devices:
generating a particular set of statistics on one or more variables of data records of the particular data source, without receiving a request from the client for the particular set of statistics; and
providing, to the client, an indication of the particular set of statistics.

10. The method as recited in clause 9, further comprising performing, by the one or more computing devices:
selecting a subset of the data records of the particular data source to be used to generate the particular set of statistics.

11. The method as recited in any of clauses 6-9, further comprising performing, by the one or more computing devices:
identifying a workload distribution strategy for the first request, wherein said identifying comprises one or more of: (a) determining a number of passes of processing a data set of the particular operation (b) determining a parallelization level for processing a data set of the particular operation, (c) determining a convergence criterion to be used to terminate the particular operation, (d) determining a target durability level for intermediate data produced during the particular operation, or (e) determining a resource capacity limit for implementing the particular operation.

12. The method as recited in clause 11, further comprising performing, by the one or more computing devices:
selecting a particular set of provider network resources to implement the first workload strategy.

13. The method as recited in any of clauses 6-9 or 11, further comprising performing, by the one or more computing devices:
in response to determining that performing the particular operation includes an execution of a module developed by an entity external to the provider network, identifying a particular security container from which to select at least one resource to be used for the particular operation.

14. The method as recited in any of clauses 6-9, 11 or 13, further comprising performing, by the one or more computing devices:
providing, to the client, an executable version of a particular machine learning model for execution at a platform outside the provider network.

15. The method as recited in any of clauses 6-9, 11, or 13-14, further comprising performing, by the one or more computing devices:
verifying, prior to scheduling the particular operation, that a resource quota of the client has not been exhausted.

16. A non-transitory computer-accessible storage medium storing program instructions that when executed on one or more processors:
receive, via a particular programmatic interface of a set of programmatic interfaces implemented at a network-accessible machine learning service of a provider network, a first request from a client to perform a particular operation associated with an instance of an entity type, wherein the entity type comprises one or more of: (a) a data source to be used for generating a machine learning model, (b) a set of statistics to be computed from a particular data source, (c) a machine learning model employing a selected algorithm, or (d) an alias associated with a machine learning model;
insert a job corresponding to the first request in a job queue of the machine learning service;
receive, prior to a completion of the particular operation indicated in the first request, a second request from the client to perform a second operation dependent on a result of the particular operation; and
insert a second job object corresponding to the second request in the job queue, wherein the second job object includes an indication of a dependency of the second operation on a result of the particular operation.

17. The non-transitory computer-accessible storage medium as recited in clause 16, wherein the particular operation comprises assignment of an alias usable by a designated group of users of the machine learning service to execute a particular machine learning model, wherein the alias comprises a pointer to the particular machine learning model, wherein at least some users of the designated group of users are not permitted to modify the pointer.

18. The non-transitory computer-accessible storage medium as recited in any of clauses 16-17, wherein the particular operation comprises a creation of a particular data source, wherein the instructions when executed at the one or more processors:
generate a particular set of statistics on one or more variables of data records of the particular data source, without receiving a request from the client for the particular set of statistics; and
provide, to the client, an indication of the particular set of statistics.

19. The non-transitory computer-accessible storage medium as recited in clause 18, wherein one or more variables comprise a plurality of variables, and wherein the instructions when executed on the one or more processors:
identify, based at least in part on a correlation analysis of the plurality of variables, a first set of candidate variables to be used in preference to a second set of variables as inputs to a machine learning model; and
provide an indication of the first set of variables to the client.

20. The non-transitory computer-accessible storage medium as recited in any of clauses 16-18, wherein the particular operation comprises an instantiated of a particular machine learning model in online mode, wherein the instructions when executed on the one or more processors:
select a set of provider network resources to be used for the particular machine learning model in online mode based at least in part on an expected workload level indicated by the client.

21. The non-transitory computer-accessible storage medium as recited in any of clauses 16-18 or 20, wherein the instructions when executed on the one or more processors:
receive, from the client of the service, credentials to be used to decrypt one or more data records of a particular data source to perform the particular operation.

22. The non-transitory computer-accessible storage medium as recited in any of clauses 16-18 or 20-21, wherein the instructions when executed on the one or more processors:
receive a third request from the client via an idempotent programmatic interface of the set of programmatic interfaces to perform a third operation;
determine, based on one or more of: (a) an instance identifier indicated in the third request, (b) an identifier of the client, or (c) a representation of input parameters of the third request, whether the third request is a duplicate of an earlier-submitted request; and
in response to a determination that the third request is a duplicate of an earlier-submitted request, provide an indication of success of the third request to the client, without inserting an additional job object corresponding to the third request in the job queue.

Embodiments of the disclosure can also be described in view of the following clauses:
1. A system, comprising:
one or more computing devices configured to:
receive, at a network-accessible machine learning service of a provider network, a text representation of a recipe comprising one or more of: (a) a group definitions section indicating one or more groups of variables, wherein individual ones of the one or more groups comprise a plurality of variables on which at least one common transformation operation is to be applied, (b) an assignment section defining one or more intermediate variables, (c) a dependency section indicating respective references to one or more machine learning artifacts stored in a repository, or (d) an output section indicating one or more transformation operations to be applied to at least one entity indicated in the group definitions section, the assignment section, or the dependency section;
validate, in accordance with (a) a set of syntax rules defined by the machine learning service and (b) a set of library function definitions for transformation operation types supported by the machine learning service, the text representation of the recipe;
generate an executable representation of the recipe;
store the executable representation in the repository;
determine that the recipe is to be applied to a particular data set;
verify that the particular data set meets a run-time acceptance criterion of the recipe; and
apply, using one or more selected provider network resources, a particular transformation operation of the one or more transformation operations to the particular data set.

2. The system as recited in clause 1, wherein the one or more computing devices are further configured to:
receive a request to apply the recipe to a different data set;
verify that the different data set meets the run-time acceptance criterion of the recipe; and
apply the particular transformation operation to the different data set.

3. The system as recited in any of clauses 1-2, wherein the one or more computing devices are further configured to:
provide, to a client via a programmatic interface, an indication of a respective set of one or more recipes applicable to individual ones of a plurality of machine learning problem domains.

4. The system as recited in any of clauses 1-3, wherein the text representation comprises an indication of a particular machine learning model to be executed using a result of the particular transformation operation.

5. The system as recited in any of clauses 1-4, wherein the one or more computing devices are further configured to:
determine, in response to an indication that automated parameter tuning is to be performed for the recipe, a plurality of parameter value options applicable to a different transformation operation of the one or more transformation operations;
generate, by the machine learning service, respective results of the different transformation operation using individual ones of the plurality of parameter value options; and
provide, by the machine learning service based on an analysis of the respective results, an indication of at least one candidate parameter value of the plurality of parameter value options that meets a parameter acceptance criterion.

6. A method, comprising:
performing, by one or more computing devices:
receiving, at a network-accessible machine learning service, a first representation of a recipe comprising one or more of: (a) a group definitions section indicating one or more groups of variables, wherein individual ones of the one or more groups comprise a plurality of data set variables on which at least one common transformation operation is to be applied and (b) an output section indicating one or more transformation operations to be applied to at least one entity indicated in one or more of: (i) the group definitions section or (ii) an input data set;

validating, in accordance with at least a set of library function definitions for transformation operation types supported by the machine learning service, the first representation of the recipe;

generating an executable representation of the recipe;

determining that the recipe is to be applied to a particular data set;

verifying that the particular data set meets a run-time acceptance criterion; and applying, using one or more selected provider network resources, a particular transformation operation of the one or more transformation operations to the particular data set.

7. The method as recited in clause 6, wherein the first representation is a text representation or a binary representation.

8. The method as recited in any of clauses 6-7, wherein the first representation is generated by a client of the machine learning service using a tool obtained from the machine learning service.

9. The method as recited in any of clauses 6-8, wherein a data type of at least one variable of an input data record of the particular data set comprises one or more of: (a) text, (b) a numeric data type, (c) Boolean, (d) a binary data type, (d) a categorical data type, (e) an image processing data type, (f) an audio processing data type, (g) a bioinformatics data type, or (h) a structured data type.

10. The method as recited in clause 9, wherein the data type comprises a particular structured data type, further comprising performing, by the one or more computing devices:

selecting, based at least in part on the particular structured data type, a particular library function to be used for the particular transformation operation.

11. The method as recited in any of clauses 6-9, wherein the first representation comprises an assignment section defining an intermediate variable in terms of one or more of: (a) an input data set variable or (b) an entity defined in the group definitions section, wherein the intermediate variable is referenced in the output section.

12. The method as recited in any of clauses 6-9 or 11, wherein the first representation comprises a dependency section indicating a reference to a particular artifact stored in a repository of the machine learning service, wherein the particular transformation operation consumes an output of the particular artifact as an input.

13. The method as recited in clause 12, wherein the particular artifact comprises one or more of: (a) a machine learning model, (b) a different recipe, (c) a statistics set or (d) an alias that includes a reference to a machine learning model.

14. The method as recited in any of clauses 6-9 or 11-12, wherein the particular transformation operation utilizes a user-defined function, further comprising performing, by the one or more computing devices:

receiving, at the machine learning service from a client prior to said receiving the first representation, an indication of a module implementing the user-defined function, wherein the module is in a text format or a binary format.

15. The method as recited in any of clauses 6-9, 11-12 or 14, further comprising performing, by the one or more computing devices:

validating the first representation in accordance with a set of syntax rules defined by the machine learning service.

16. The method as recited in any of clauses 6-9, 11-12, or 14-15, further comprising performing, by the one or more computing devices:

receiving a request to apply the recipe to a different data set;

verifying that the different data set meets the run-time acceptance criterion of the recipe; and applying the particular transformation operation to the different data set.

17. The method as recited in any of clauses 6-9, 11-12, or 14-16, further comprising performing, by the one or more computing devices:

providing, to a client via a programmatic interface, an indication of a respective set of one or more recipes applicable to individual ones of a plurality of machine learning problem domains.

18. The method as recited in any of clauses 6-9, 11-12, or 14-17, wherein the first representation comprises an indication of a particular machine learning model to be executed using a result of the particular transformation operation.

19. The method as recited in any of clauses 6-9, 11-12, or 14-18, further comprising performing, by the one or more computing devices:

determining, by the machine learning service in response to an indication that automated parameter tuning is to be performed for the recipe, a plurality of parameter value options applicable to a different transformation operation of the one or more transformation operations;

generating, by the machine learning service, respective results of the different transformation operation using individual ones of the plurality of parameter value options.

20. The method as recited in clause 19, further comprising performing, by the one or more computing devices:

selecting, by the machine learning service, a particular parameter value of the plurality of parameter value options as an acceptable value based at least in part on a particular result set corresponding to the particular parameter value.

21. The method as recited in any of clauses 19-20, further comprising performing, by the one or more computing devices:

indicating, by the machine learning service to a client, at least a subset of the plurality of parameter value options as candidate values based on an analysis of the respective results; and receiving, at the machine learning service from the client, an indication of a particular parameter value of the subset to be used for the different transformation operation.

22. The method as recited in any of clauses 19-21, wherein the plurality of parameter value options comprise one or more of: (a) respective lengths of n-grams to be derived from a language processing data set, (b) respective quantile bin boundaries for a particular variable, (c) image processing parameter values, (d) a number of clusters into which a data set is to be classified, (e) values for a cluster boundary threshold, or (f) dimensionality values for a vector representation of a text document.

23. A non-transitory computer-accessible storage medium storing program instructions that when executed on one or more processors:

determine, at a machine learning service, a first representation of a recipe comprising one or more of: (a) a group definitions section indicating one or more groups of variables, wherein individual ones of the one or more groups comprise a plurality of data set variables on which at least one common transformation operation is to be applied, or (b) an output section indicating one or more transformation operations to be applied to at least one entity indicated in one or more of (i) the group definitions section or (ii) an input data set of the recipe;

validate, in accordance with at least a set of library function definitions for transformation operation types supported by the machine learning service, the first representation of the recipe;

generate an executable representation of the recipe; and in response to a determination that the recipe is to be applied to a particular data set, use one or more selected provider network resources to implement a particular transformation operation of the one or more transformation operations to the particular data set.

24. The non-transitory computer-accessible storage medium as recited in clause 23, wherein the first representation comprises an assignment section defining an intermediate variable in terms of one or more of: (a) an input data set variable or (b) an entity defined in the group definitions section, wherein the intermediate variable is referenced in the output section.

25. The non-transitory computer-accessible storage medium as recited in any of clauses 23-24, wherein the first representation comprises a dependency section indicating a reference to a particular artifact stored in a repository of the machine learning service, wherein the particular transformation operation consumes an output of the particular artifact as an input.

26. The non-transitory computer-accessible storage medium as recited in any of clauses 23-25, wherein the particular artifact comprises one or more of: (a) a machine learning model, (b) a different recipe, (c) an alias or (d) a set of statistics.

27. The non-transitory computer-accessible storage medium as recited in any of clauses 23-26, wherein the set of library function definitions comprise one or more of: (a) a quantile bin function, (b) a Cartesian product function, (c) a bi-gram function, (d) an n-gram function, (e) an orthogonal sparse bigram function, (f) a calendar function, (g) an image processing function, (h) an audio processing function, (i) a bio-informatics processing function, or (j) a natural language processing function.

Conclusion

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A computer implemented method comprising:
   receiving, via a programmatic interface of a network-accessible machine learning service of a provider network, a data source creation request from a client specifying an address for a data set;
   responsive to the data source creation request:
      generating and storing a data source artifact corresponding to the address;
      generating statistics of data retrieved from data source artifact; and
      providing the statistics to the client;
   receiving, via the programmatic interface, a model execution request from the client to execute a model, the model execution request specifying the data source artifact as input data and a type of output of the model; and
   responsive to the model execution request:
      instantiating the model on a set of resources in the provider network; and
      executing the model using data retrieved from data source artifact and storing the model's output.

2. The computer implemented method of claim 1, wherein the data source creation request specifies a format or schema of data records in the data set.

3. The computer implemented method of claim 1, wherein:
   the data source creation request specifies a sampling, splitting, or rearrangement of data records in the data set; and
   the generating of the statistics is performed according to the sampling, splitting, or rearrangement.

4. The computer implemented method of claim 1, providing the statistics to the client comprises:
   providing, in a first phase, initial statistics determined from a sub-sample of the data set; and
   providing, in a second phase, full-sample statistics determined from the data set in its entirety.

5. The computer implemented method of claim 1, further comprising:
   receiving, via the programmatic interface, a statistics creation request specifying the data source artifact and a statistics descriptor indicating one or more types of statistics to generate; and
   responsive to the statistics creation request, generating and storing the one or more types of statistics indicated in the statistics descriptor for the data source artifact.

6. The computer implemented method of claim 1, wherein:
   the model execution request's output type specifies an evaluation execution; and
   executing the model comprises determining and storing one or more accuracy measures of the model based at least in part on the model's output.

7. The computer implemented method of claim 1, wherein:
   the model execution request specifies a data transformation recipe; and
   executing the model comprises applying the data transformation recipe to data from the data source artifact to generate the input data for the model.

8. The computer implemented method of claim 1, wherein:
the model execution request specifies an expected workload level for the model; and
further comprising selecting the set of resources in the provider network for executing the model based at least in part on the expected workload level.

9. The computer implemented method of claim 1, further comprising:
receiving, via the programmatic interface, a model publishing request to publish the model under an alias; and
responsive to the model publishing request:
mounting the model in an online execution mode; and
publishing the alias to permit the model to be executed via the alias.

10. The computer implemented method of claim 9, further comprising:
responsive to the model execution request, generating a notification indicating that the model associated with the alias has changed since a last execution via the alias.

11. The computer implemented method of claim 1, further comprising:
receiving, via the programmatic interface, a client request to obtain the model specifying an execution architecture for the model; and
responsive to the client request:
generating an executable representation of the model for the execution architecture and providing the executable representation.

12. A system, comprising:
one or more hardware processors with associated memory that implement a network-accessible machine learning service, configured to:
receive, via a programmatic interface of the machine learning service, a data source creation request from a client specifying an address for a data set;
responsive to the data source creation request:
generate and store a data source artifact corresponding to the address;
generate statistics of data retrieved from data source artifact; and
provide the statistics to the client;
receive, via the programmatic interface, a model execution request from the client to execute a model, the model execution request specifying the data source artifact as input data and a type of output of the model; and
responsive to the model execution request:
instantiate the model on a set of resources in the machine learning service; and
execute the model using data retrieved from data source artifact and store the model's output.

13. The system of 12, wherein the programmatic interface comprises a representational state transfer (REST) implemented based on a hypertext transfer protocol (HTTP) protocol.

14. The system of 12, wherein the programmatic interface is configured to be invoked via one or more software development kit (SDK) libraries.

15. The system of claim 12, wherein the data source creation request specifies a format or schema of data records in the data set.

16. The system of claim 12, wherein to provide the statistics to the client, the machine learning service is configured to:
provide, in a first phase, initial statistics determined from a sub-sample of the data set; and
provide, in a second phase, full-sample statistics determined from the data set in its entirety.

17. The system of claim 12, wherein the machine learning service is configured to:
receive, via the programmatic interface, a statistics creation request specifying the data source artifact and a statistics descriptor indicating one or more types of statistics to generate; and
responsive to the statistics creation request, generate and store the one or more types of statistics indicated in the statistics descriptor for the data source artifact.

18. One or more non-transitory computer-accessible storage media storing program instructions that when executed on or across one or more processors implementing a machine learning service, cause the machine learning service to:
receive, via a programmatic interface of the machine learning service, a data source creation request from a client specifying an address for a data set;
responsive to the data source creation request:
generate and store a data source artifact corresponding to the address;
generate statistics of data retrieved from data source artifact; and
provide the statistics to the client;
receive, via the programmatic interface, a model execution request from the client to execute a model, the model execution request specifying the data source artifact as input data and a type of output of the model; and
responsive to the model execution request:
instantiate the model on a set of resources in the machine learning service; and
execute the model using data retrieved from data source artifact and store the model's output.

19. The one or more non-transitory computer-accessible storage media of claim 18, wherein:
the model execution request specifies a data transformation recipe; and
to execute the model, the program instructions when executed on or across the one or more cause the machine learning service to apply the data transformation recipe to data from the data source artifact to generate the input data for the model.

20. The one or more non-transitory computer-accessible storage media of claim 18, wherein:
the model execution request specifies an expected workload level for the model; and
the program instructions when executed on or across the one or more cause the machine learning service to select the set of resources in the machine learning service for executing the model based at least in part on the expected workload level.

* * * * *